United States Patent
Yoda et al.

(10) Patent No.: US 11,352,516 B2
(45) Date of Patent: *Jun. 7, 2022

(54) WATER-BASED INKJET INK AND PRODUCTION METHOD FOR PRINTED MATTER

(71) Applicants: TOYO INK SC HOLDINGS CO., LTD., Tokyo (JP); TOYOCOLOR CO. LTD., Tokyo (JP)

(72) Inventors: Atsushi Yoda, Tokyo (JP); Yoshihito Suzuki, Tokyo (JP); Mayuko Okamoto, Tokyo (JP); Kazuhiro Jonai, Tokyo (JP); Norio Suzuki, Tokyo (JP)

(73) Assignees: TOYO INK SC HOLDINGS CO., LTD., Tokyo (JP); TOYOCOLOR CO., LTD, Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 16/626,050

(22) PCT Filed: Apr. 17, 2018

(86) PCT No.: PCT/JP2018/015873
§ 371 (c)(1),
(2) Date: Dec. 23, 2019

(87) PCT Pub. No.: WO2019/003594
PCT Pub. Date: Jan. 3, 2019

(65) Prior Publication Data
US 2021/0214569 A1     Jul. 15, 2021

(30) Foreign Application Priority Data

Jun. 30, 2017 (JP) .............................. JP2017-129813

(51) Int. Cl.
| | | |
|---|---|---|
| *C09D 11/322* | (2014.01) | |
| *B41J 2/21* | (2006.01) | |
| *B41M 5/00* | (2006.01) | |
| *B41M 5/50* | (2006.01) | |
| *C09D 11/107* | (2014.01) | |
| *C09D 11/108* | (2014.01) | |
| *C09D 11/38* | (2014.01) | |

(52) U.S. Cl.
CPC .......... *C09D 11/322* (2013.01); *B41J 2/2107* (2013.01); *B41M 5/0023* (2013.01);
(Continued)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; C09D 151/08; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 11/00; B41M 5/0023; B41M 7/0081; B41M 3/006; B41M 3/003;
(Continued)

(56) References Cited

U.S. PATENT DOCUMENTS 8,328,342 B2 * 12/2012 Irita ..................... B41M 5/0017
    347/100
8,777,392 B2 * 7/2014 Ohya ..................... B41J 2/2107
    347/100

(Continued)

FOREIGN PATENT DOCUMENTS

| EP | 3 632 999 A1 | 4/2020 |
|---|---|---|
| JP | 2001-354888 A | 12/2001 |
| JP | 2004-210996 A | 7/2004 |
| JP | 2008-247941 A | 10/2008 |
| JP | 2009-079209 A | 4/2009 |

(Continued)

OTHER PUBLICATIONS

JPO Office Action for Application No. 2017-129813 dated Apr. 10, 2018.

(Continued)

*Primary Examiner* — Manish S Shah
(74) *Attorney, Agent, or Firm* — Sughrue Mion, PLLC

(57) ABSTRACT

One embodiment relates to a water-based inkjet ink containing at least water, a pigment, a water-soluble organic solvent and a binder resin, wherein the water-soluble organic solvent contains at least a water-soluble organic solvent having a surface tension of 30 to 50 mN/m and a boiling point at 1 atmosphere of 180 to 230° C., in an amount of 15 to 50% by weight relative to the total weight of the water-based inkjet ink, and the acid value of the binder resin is at least 5 mgKOH/g but less than 60 mgKOH/g.

18 Claims, No Drawings

(52) U.S. Cl.
CPC ........... *B41M 5/502* (2013.01); *C09D 11/107* (2013.01); *C09D 11/108* (2013.01); *C09D 11/38* (2013.01)

(58) Field of Classification Search
CPC .............. B41M 5/0011; B41M 5/0017; B41M 5/0047; B41M 7/00; B41M 7/0072; B41M 5/52; B41M 5/5218; B41M 5/5227; B41M 5/0076; G02B 5/20; G02B 5/223; C08K 3/11; C08K 2003/2237; C14C 11/006

See application file for complete search history.

(56) References Cited

U.S. PATENT DOCUMENTS

| | | | |
|---|---|---|---|
| 2007/0225400 A1 | 9/2007 | Schmid et al. | |
| 2012/0306964 A1* | 12/2012 | Nakajima | C09D 11/322 347/22 |
| 2013/0338273 A1* | 12/2013 | Shimanaka | C09D 11/322 524/88 |
| 2015/0035896 A1 | 2/2015 | Gotou et al. | |
| 2015/0103116 A1 | 4/2015 | Gotou | |
| 2018/0030298 A1 | 2/2018 | Yamazaki et al. | |
| 2018/0142110 A1 | 5/2018 | Maeda | |
| 2018/0237646 A1* | 8/2018 | Yoda | C09D 11/326 |
| 2019/0077978 A1 | 3/2019 | Suzuki et al. | |
| 2019/0292395 A1 | 9/2019 | Matsumoto et al. | |
| 2019/0330486 A1 | 10/2019 | Sugihara et al. | |
| 2020/0010708 A1 | 1/2020 | Sugihara et al. | |

FOREIGN PATENT DOCUMENTS

| | | |
|---|---|---|
| JP | 2010-047660 A | 3/2010 |
| JP | 2011-190400 A | 9/2011 |
| JP | 2012-251049 A | 12/2012 |
| JP | 2013-203910 A | 10/2013 |
| JP | 2014-024944 A | 2/2014 |
| JP | 2015-117354 A | 6/2015 |
| JP | 2015-212319 A | 11/2015 |
| JP | 2016-190995 A | 11/2016 |
| JP | 2017-71662 A | 4/2017 |
| JP | 2017-101160 A | 6/2017 |
| WO | 2011/021591 A1 | 2/2011 |
| WO | 2012/124212 A1 | 9/2012 |
| WO | 2016/152580 A1 | 9/2016 |
| WO | 2016-210959 A | 12/2016 |
| WO | 2017/159685 A1 | 9/2017 |
| WO | 2017/168817 A1 | 10/2017 |
| WO | 2018/135237 A1 | 7/2018 |
| WO | 2018/142726 A1 | 8/2018 |
| WO | 2018/221045 A1 | 12/2018 |

OTHER PUBLICATIONS

JPO Office Action for Application No. 2018-115552 dated Jul. 31, 2018.
International Search Report for PCT/JP2018/015873 dated Jul. 3, 2018 [PCT/ISA/210].
Extended European Search Report dated May 26, 2020, from the European Patent Office in Application No. 18824509.6.

\* cited by examiner

WATER-BASED INKJET INK AND PRODUCTION METHOD FOR PRINTED MATTER

CROSS REFERENCE TO RELATED APPLICATIONS

This application is a National Stage of International Application No. PCT/JP2018/015873, filed on Apr. 17, 2018, which claims priority from Japanese Patent Application No. 2017-129813, filed on Jun. 30, 2017.

TECHNICAL FIELD

Embodiments of the present invention relate to a water-based inkjet ink and a production method for printed matter that uses the water-based inkjet ink.

BACKGROUND ART

Unlike conventional plate-base printing such as offset printing, digital printing does not require a printing plate, and can therefore realize cost reductions and space-saving effects. Among such digital printing methods, in the inkjet recording method, ink droplets are discharged from extremely fine nozzles and adhered directly to a printing substrate to form text or images. Using this type of recording method offers the advantages that the printing apparatus used is small, noise from the apparatus is minor, and operability and color production are simple. As a result, digital printing output devices have become widely used, not only in offices, but also in households.

Furthermore, as a result of improvements in inkjet technology, the use of inkjet printing for digital printing output devices in industrial applications is also expected to increase. In actual fact, inkjet printing devices for printing solvent inks or UV inks to plastic substrates such as polyvinyl chloride and PET are now commercially available. However, in recent years, as a result of considering and addressing potential harm to people and the environment, restrictions on the use of the solvents and monomers continue to be introduced. Consequently, the demand for water-based inks as an alternative to the solvent inks and UV inks that contain these types of restricted materials is growing.

In terms of water-based inks for inkjet printing, conventionally, the development of water-based inks for printing to plain paper and specialty papers such as photographic glossy papers has continued to progress (Patent Literatures 1, 2 and 3). On the other hand, in recent years, there have been growing expectations of an expansion in the potential applications of the inkjet recording method, and there are growing needs for direct printing to coated paper substrates such as coated papers, art papers, finely coated papers and cast papers, and to plastic substrates such as polyvinyl chloride sheets, PET films and PP films.

However, because the water that represents the main solvent of water-based inks has a high surface tension, water-based inks tend to exhibit poor wet spreading on low-absorption substrates such as the substrates described above, due to the low surface energy of the substrates themselves, and also exhibit poor penetration into the substrates. Accordingly, when water-based inks are used for performing printing to low-absorption substrates, voids caused by unsatisfactory wet spreading of the ink, and color boundary bleeding and mottling (density irregularities in the printed portion) caused by coalescence of undried ink droplets of different colors tend to occur more readily, making the image quality prone to deterioration.

Various investigations have already been conducted with the object of improving the image quality on low-absorption substrates. For example, Patent Literature 4 discloses that by using an ink that uses an alkylene polyol having a boiling point within a specific range and polymer particles, mottling on low-absorption substrates can be reduced, and printed matter having superior image quality can be obtained. However, if polymer particles are used as a binder resin, then a problem arises in that when the ink is left in standby mode inside the inkjet head for a long period of time, the ink tends to be prone to solidification on the end surfaces of the inkjet nozzles, making it difficult to maintain excellent discharge stability. Further, another problem arises in that when the ink described above is printed onto a low-absorption substrate, the polymer particles tend to form a film before the ink that has impacted the substrate has been able to undergo satisfactory wet spreading, resulting in voids and the like occurring in the printed portions.

Patent Literature 5 discloses that by using an ink that contains a combination of a pigment dispersant having a specific structure, a silicone oil, and an organic solvent, a combination of superior printed image quality on low-absorption substrates and superior discharge stability can be achieved. However, in the inks disclosed in this Patent Literature 5, high-boiling point solvents typified by glycerol are used, and when such inks are printed onto low-absorption substrates or the like, achieving satisfactory drying in a short period of time is difficult. Further, another problems that arises is that because of these inferior drying properties, achieving the desired level of coating film durability is also difficult.

Moreover, Patent Literature 6 discloses that by using a water-soluble acrylic resin having a specific acid value and weight average molecular weight as a binder resin, the coating film durability can be improved. However, when the resins used in the examples of this Patent Literature 6 were actually synthesized, and inks containing these resins were then used to perform printing tests using an inkjet one-pass printing method, it was found that when the printed matter was rolled or the like following printing, the printed matter could sometimes be damaged. It is thought that this suggests that, depending on the printing conditions, the ink of Patent Literature 6 may not reach a practically applicable level of quality in terms of coating film durability.

CITATION LIST

Patent Literature

PLT 1: JP 2001-354888 A
PLT 2: JP 2004-210996 A
PLT 3: JP 2008-247941 A
PLT 4: JP 2012-251049 A
PLT 5: JP 2013-203910 A
PLT 6: JP 2010-047660 A

SUMMARY OF INVENTION

Technical Problem

Embodiments of the present invention have been developed to address the problems outlined above, and one embodiment has an object of providing a water-based inkjet ink that can produce printed matter having excellent image quality with no voids and various superior coating film durability properties, even when using low-absorption substrates such as coated papers, art papers and finely coated papers, and also exhibits excellent discharge stability from inkjet nozzles and superior drying properties upon printing. Further, another embodiment of the present invention has an object of providing a production method for printed matter that can favorably realize the effects of the above water-based inkjet ink. Moreover, another object of an embodiment of the present invention is to provide a water-based inkjet ink which, in addition to the above properties, also exhibits excellent storage stability.

Solution to Problem

The inventors of the present invention conducted intensive research with the aim of achieving the above objects, and discovered that by using a water-soluble binder resin having a low acid value, while controlling the wet spreading and drying properties of the ink on the printing substrate by controlling the surface tension and boiling point of the water-soluble organic solvent being used, printed coating film durability of a practically applicable quality level could be achieved, thus enabling them to complete the present invention.

In other words, one embodiment of the present invention relates to a water-based inkjet ink containing at least water, a pigment, a water-soluble organic solvent and a binder resin, wherein the water-soluble organic solvent contains a water-soluble organic solvent having a surface tension of 30 to 50 mN/m and a boiling point at 1 atmosphere of 180 to 230° C., the amount of the water-soluble organic solvent having a surface tension of 30 to 50 mN/m and a boiling point at 1 atmosphere of 180 to 230° C. is from 15 to 50% by weight relative to the total weight of the water-based inkjet ink, and the acid value of the binder resin is at least 5 mgKOH/g but less than 60 mgKOH/g.

Further, one embodiment of the present invention relates to the water-based inkjet ink described above, wherein the water-soluble organic solvent contains an alkanediol of at least 4 carbon atoms.

Further, one embodiment of the present invention relates to either of the water-based inkjet inks described above, wherein the amount of the alkanediol of at least 4 carbon atoms is from 10 to 95% by weight relative to the total weight of the water-soluble organic solvent.

Further, one embodiment of the present invention relates to any one of the water-based inkjet inks described above, wherein the water-soluble organic solvent contains an alkanediol of not more than 3 carbon atoms.

Further, one embodiment of the present invention relates to any one of the water-based inkjet inks described above, wherein the binder resin is a copolymer having at least a structural unit derived from a monomer having a carboxyl group and a structural unit derived from a monomer having an alkyl group.

Further, one embodiment of the present invention relates to any one of the water-based inkjet inks described above, wherein the binder resin contains at least a (meth)acrylic resin and/or a styrene-(meth)acrylic-based copolymer.

Further, one embodiment of the present invention relates to any one of the water-based inkjet inks described above, wherein the weight average molecular weight (Mw) of the binder resin is within a range from 5,000 to 20,000.

Further, one embodiment of the present invention relates to any one of the water-based inkjet inks described above, wherein the amount of the binder resin is from 2 to 10% by weight relative to the total weight of the water-based inkjet ink.

Further, one embodiment of the present invention relates to any one of the water-based inkjet inks described above, wherein the water-based inkjet ink has a surface tension at 25° C. of 20 to 35 mN/m and a viscosity at 25° C. of 1 to 20 mPa·s.

Furthermore, one embodiment of the present invention relates to a method for producing any one of the water-based inkjet inks described above, wherein the method includes a step of mixing and stirring a pigment dispersion containing at least the pigment and water, the binder resin, and the water-soluble organic solvent.

Furthermore, one embodiment of the present invention relates to a production method for water-based inkjet ink printed matter that includes a step of applying any one of the water-based inkjet inks described above to a substrate being transported at a speed of at least 30 m/minute using a line pass type inkjet printing system, and a step of applying thermal energy to the substrate to dry the water-based inkjet ink.

Further, one embodiment of the present invention relates to the production method for water-based inkjet ink printed matter described above, wherein the method used for drying the water-based inkjet ink uses infrared irradiation.

Furthermore, one embodiment of the present invention relates to printed matter obtained by printing any one of the water-based inkjet inks described above onto a substrate.

The disclosure of this application is related to the subject matter disclosed in prior Japanese Patent Application 2017-129813 filed on Jun. 30, 2017, the entire contents of which are incorporated herein by reference.

Advantageous Effects of Invention

An embodiment of the present invention is able to provide a water-based inkjet ink that can produce printed matter having excellent image quality with no voids and various superior coating film durability properties, even when using low-absorption substrates such as coated papers, art papers and finely coated papers, and also exhibits excellent discharge stability from inkjet nozzles and superior drying properties upon printing. Further, another embodiment of the present invention is able to provide a production method for printed matter that can favorably realize the effects of the above water-based inkjet ink. Moreover, embodiments of the present invention are able to provide a water-based inkjet ink which, in addition to the above properties, also exhibits excellent storage stability.

DESCRIPTION OF EMBODIMENTS

Preferred embodiments of the present invention are presented below to describe the water-based inkjet ink (hereafter also referred to as simply "the water-based ink" or "the ink") and the production method for printed matter that represent embodiments of the present invention (hereafter also referred to as "the present embodiments").

<Water-Based Inkjet Ink>

As already described above, low-absorption substrates such as coated papers, art papers and finely coated papers exhibit a small surface energy for the substrate itself, meaning achieving satisfactory wet spreading of water-based inks is not easy. If the wet spreading is unsatisfactory, then the ink coverage in solid printed portions and the like is inadequate, and image defects such as voids tend to occur. In addition, compared with printing to high-absorption substrates such as high-quality papers, ink penetration and the like occur less readily on low-absorption substrates, meaning the drying properties also deteriorate. As a result, ink droplets that have remained on the substrate for a long period tend to coalesce, causing color boundary bleeding and/or mottling. As mentioned above, when printing to low-absorption substrates, it is necessary to ensure satisfactory wet spreading and drying properties.

In particular, the water that represents the main component of a water-based ink has a much higher surface tension than other organic solvents, and has an adverse effect on the wet spreading properties. In order to compensate for this problem, water-based inks generally also contain a water-soluble organic solvent that has a low surface tension. The water-soluble organic solvent having a low surface tension can improve the wet spreading on low-absorption substrates, and can also promote the penetration of the ink into the interior of low-absorption substrates, meaning that even on a low-absorption substrate, voids and mottling can be suppressed and printed matter having excellent drying properties can be obtained.

On the other hand, when a water-soluble organic solvent having a low surface tension is used in combination with a binder resin, there is a possibility of an adverse effect on the ink properties. In water-based inks, binder resin are generally used to impart the printed matter with coating film durability, and it is known that binder resins having a larger weight average molecular weight yield more superior coating film durability for the printed matter. Further, the binder resins used in water-based inks can be broadly classified into two types, namely water-dispersible resin microparticles and water-soluble resins, with one of these types, or a combination of both types, used in accordance with the properties required for the water-based ink.

Water-soluble organic solvents having a low surface tension exhibit favorable affinity with binder resins. In those cases where water-dispersible resin microparticles are used as the binder resin, the water-soluble organic solvent having a low surface tension functions as a film formation assistant, and a problem arises in that the water-dispersible resin microparticles tend to dissolve. In particular, at air-liquid interfaces such as at the end surfaces of the inkjet nozzles, the lower boiling point water tends to volatilize preferentially, thereby concentrating the water-soluble organic solvent having a low surface tension, which promotes the dissolution of the water-dispersible resin microparticles. Subsequently, when drying proceeds further and the water-soluble organic solvent having a low surface tension volatilizes, the water-dispersible resin microparticles dissolved in the water-soluble organic solvent precipitate and form a film, which may block the inkjet head nozzles or form a deposit that can dramatically worsen the discharge stability. Further, during the process of the ink drying on a low-absorption substrate, film formation may occur prior to satisfactory wet spreading of the ink on the substrate, meaning voids are more likely to occur in the printed matter.

Further, in those cases where the binder resin is a water-soluble resin, it is thought that a portion of the binder resin still dissolves in the water-soluble organic solvent having a low surface tension. As a result, as the abundance ratio of the water-soluble organic solvent having a low surface tension changes at air-liquid interfaces changes as volatilization progresses, precipitation of the water-soluble resin or an increase in viscosity as the degree of solubility approaches saturation tend to occur, leading to a deterioration in discharge stability including discharge faults or discharge delays. Moreover, during the process of the ink drying on a low-absorption substrate, there is a possibility that the ink viscosity may increase prior to satisfactory wet spreading of the ink on the substrate, leading to a loss of fluidity and the occurrence of voids.

In light of the current circumstances described above, in the present embodiments, a water-soluble organic solvent having a surface tension of 30 to 50 mN/m and a boiling point at 1 atmosphere of 180 to 230° C. (hereafter also referred to as "the specified water-soluble organic solvent") is included in an amount of 15 to 50% by weight relative to the total weight of the water-based inkjet ink. The surface tension range from 30 to 50 mN/m is slightly high among water-soluble organic solvents, thereby preventing excessive affinity with the binder resin.

On the other hand, compared with water-based inks that use the type of organic solvent having a low surface tension described above, a water-based ink that uses the specified water-soluble organic solvent still does not provide satisfactory improvement in the levels of voids and mottling and the drying properties on low-absorption substrates and the like. As a result of intensive investigation concerning this problem, the inventors of the present invention discovered that by ensuring that the acid value of the binder resin also used in the ink was at least 5 mgKOH/g but less than 60 mgKOH/g, the above problem could be favorably resolved. Although detailed reasons remain unclear, it is thought that a binder resin having this type of acid value functions as a surfactant having acid groups that function as hydrophilic units and a resin skeleton that functions as a hydrophobic unit. As a result, liquid droplets of the water-based ink that strike the surface of a low-absorption substrate undergo favorable wet spreading, and the binder resin orients at the liquid droplet surface, thereby suppressing coalescence of the liquid droplets. As a result, it is thought that voids and mottling can be suppressed, even on low-absorption substrates, and printed matter having excellent drying properties can be obtained, while maintaining favorable discharge stability.

As described above, in order to obtain an ink that combines favorable discharge stability, printed matter image quality, drying properties and coating film durability, it is essential to control the ink performance by selecting a specified water-soluble organic solvent, and combing this solvent with a binder resin having a favorable acid value. It should be noted that the mechanisms described above are merely conjecture, and in no way limit the present invention.

Each of the components contained in the water-based ink of the present embodiments is described below.

(Water-Soluble Organic Solvent)

As described above, the water-soluble organic solvent used in the present embodiments is selected from the viewpoints of ensuring favorable wet spreading on substrates, and particularly low-absorption substrates, improving the ink drying properties, and ensuring favorable discharge properties from inkjet nozzles.

As described above, from the viewpoints of preventing excessive affinity with the binder resin, while also achieving comparatively superior wet spreading properties and favorable penetration into the interior of low-absorption substrates, thereby suppressing bleeding between dots and making it easier to obtain printed matter having little mottling, even on low-absorption substrates, the organic solvent used in the present embodiments contains a water-soluble organic solvent having a surface tension of 30 to 50 mN/m.

The surface tension in the present embodiments refers to the static surface tension measured in an environment at 25°

C. using the Wilhelmy method (plate method, vertical plate method). From the viewpoints of achieving superior wet spreading on low-absorption substrates and superior penetration into the interior of these substrates, the surface tension of the organic solvent used in the present embodiments is more preferably within a range from 30 to 40 mN/m, even more preferably from 30 to 36 mN/m, and most preferably from 30 to 32 mN/m.

Furthermore, in terms of obtaining a water-based ink having favorable printed image quality, drying properties and discharge stability when combined with the binder resin, the boiling point at 1 atmosphere of the above water-soluble organic solvent having a surface tension of 30 to 50 mN/m is within a range from 180 to 230° C., preferably from 180 to 220° C., and even more preferably from 190 to 210° C.

On the other hand, in another embodiment, an ink containing a specified water-soluble organic solvent for which the boiling point at 1 atmosphere is within a range from 210 to 230° C. is capable of ensuring favorable moisture retention at the inkjet nozzles, and is capable of exhibiting excellent discharge stability.

The boiling point in the present embodiments can be measured, for example, using a thermal analysis apparatus such as a thermogravimetric differential thermal analyzer (TG-DTA).

In the ink of an embodiment of the present invention, a single water-soluble organic solvent having a surface tension of at least 30 mN/m but not more than 50 mN/m and a boiling point at 1 atmosphere of at least 180° C. but not more than 230° C. may be used alone, or a combination of a plurality of such solvents may be used. Specific examples of the solvent include:

polyol-based solvents such as ethylene glycol, 1,2-propanediol, 1,3-propanediol, 1,2-butanediol, 1,3-butanediol, 1,4-butanediol, 2-methyl-1,3-propanediol, 3-methyl-1,3-butanediol, 2,2-dimethyl-1,3-propanediol, and dipropylene glycol;

ethylene glycol monoether-based solvents such as diethylene glycol monomethyl ether, diethylene glycol monoethyl ether, and diethylene glycol monobenzyl ether;

ethylene glycol monoether acetate-based solvents such as diethylene glycol monoethyl ether acetate; and nitrogen-containing solvents such as N,N-dimethyl-β-methoxypropionamide, N-methylpyrrolidone, and γ-butyrolactone.

Furthermore, other examples of the ethylene glycol monoether-based solvents include diethylene glycol monopropyl ether and diethylene glycol monoisopropyl ether.

Among the specific examples listed above, the use of a water-soluble organic solvent other than the nitrogen-containing solvents is preferred, and the use of a polyol-based solvent is more preferred.

Among the above specific examples, in the present embodiments, the use of one or more types of water-soluble organic solvent selected from among those alkanediols having at least 4 carbon atoms, for example, 1,2-butanediol, 1,3-butanediol, 1,4-butanediol, 2-methyl-1,3-propanediol, 3-methyl-1,3-butanediol and 2,2-dimethyl-1,3-propanediol, is preferred, and of these solvents, the use of one or more types of organic solvent selected from among the linear alkane diols, for example, 1,2-butanediol, 1,3-butanediol and 1,4-butanediol, is particularly preferred, and the use of the 1,2-alkanediol 1,2-butanediol is the most desirable. Alkanediols of at least 4 carbon atoms have hydroxyl groups that function as hydrophilic units and an alkyl group that functions as a hydrophobic unit within the one molecule, and not only have high affinity for water, but in a similar manner to the binder resin, are also thought to be capable of reducing the ink surface tension to a value within the preferred range. Accordingly, the ink wet spreading can be improved, and printed matter having excellent printed image quality can be more easily obtained. It is thought that these phenomena manifest particularly markedly in the case of a 1,2-alkanediol where the hydroxyl groups exist close to one another. Moreover, although the details remain unclear, inks that use 1,2-butanediol also exhibit excellent storage stability.

In another embodiment, one or more types of water-soluble organic solvent selected from among alkanediols of not more than 3 carbon atoms, for example, ethylene glycol, 1,2-propanediol and 1,3-propanediol, may also be used favorably as the water-soluble organic solvent having a surface tension of at least 30 mN/m but not more than 50 mN/m and a boiling point at 1 atmosphere of at least 180° C. but not more than 230° C. The above alkanediols of not more than 3 carbon atoms have a particularly low boiling point among the specified water-soluble organic solvents, meaning inks that use these alkanediols of not more than 3 carbon atoms exhibit markedly superior drying properties. As described below, the above alkanediols of not more than 3 carbon atoms have comparatively high surface tension values of 35 to 50 mN/m, and therefore from the viewpoint of obtaining an ink that also exhibits excellent printed image quality regardless of the type of substrate used, are preferably used in combination with a surfactant.

Moreover, in another embodiment, when an aforementioned specified water-soluble organic solvent having a boiling point at 1 atmosphere of 210 to 230° C. is selected, by using a solvent having two or more hydroxyl groups among the compounds listed above, an ink having excellent discharge stability and storage stability can be obtained. Specifically, the selection of one or more types of water-soluble organic solvent from among 1,3-propanediol, 1,4-butanediol, 2-methyl-1,3-propanediol, 2,2-dimethyl-1,3-propanediol and dipropylene glycol is preferred.

In order to adjust the printed image quality, the discharge stability, the drying properties and the storage stability of the water-based ink, a combination of two or more types of water-soluble organic solvent selected from among the above alkanediols of at least 4 carbon atoms, the above alkanediols of not more than 3 carbon atoms, and those specified water-soluble organic solvents having a boiling point at 1 atmosphere of 210 to 230° C. that also have two or more hydroxyl groups, may also be used.

Furthermore, in the water-based ink of an embodiment of the present invention, water-soluble organic solvents other than the specified water-soluble organic solvent described above may also be used, either individually or in a combination containing a plurality of such solvents. However, the amount of these solvents is preferably adjusted to a level that does not cause any reduction in the desired effects.

Specific examples of these water-soluble organic solvents other than the specified water-soluble organic solvent include:

polyol-based solvents such as 1,2-pentanediol, 1,5-pentanediol, 1,2-hexanediol, 1,6-hexanediol, 3-methyl-1,5-pentanediol, 1,6-hexanediol, and glycerol;

monohydric alcohol-based solvents such as 2-propanol, 1-butanol, 2-butanol, 3-methoxy-1-butanol, and 3-methoxy-3-methylbutanol;

propylene glycol monoether-based solvents such as propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether;

propylene glycol diether-based solvents such as propylene glycol dimethyl ether, dipropylene glycol dimethyl ether and tripropylene glycol dimethyl ether;

ethylene glycol monoether-based solvents such as ethylene glycol monomethyl ether, ethylene glycol monoethyl ether, ethylene glycol monobutyl ether, ethylene glycol 2-ethylhexyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, and triethylene glycol monobutyl ether;

ethylene glycol diether-based solvents such as diethylene glycol methyl ethyl ether, diethylene glycol methyl butyl ether, triethylene glycol methyl ethyl ether, triethylene glycol methyl butyl ether, diethylene glycol diethyl ether, triethylene glycol diethyl ether, tetraethylene glycol dimethyl ether, tetraethylene glycol diethyl ether, tetraethylene glycol methyl ethyl ether, and tetraethylene glycol methyl butyl ether; and nitrogen-containing solvents such as 2-pyrrolidone, N-methyloxazolidinone, and ε-caprolactone.

For the same reasons as those described above for the case of the specified water-soluble organic solvent, the above water-soluble organic solvent other than the specified water-soluble organic solvent preferably also contains an alkanediol of at least 4 carbon atoms. Among the compounds listed above, examples of alkanediols of at least 4 carbon atoms include 1,2-pentanediol, 1,5-pentanediol, 1,2-hexanediol, 1,6-hexanediol, 3-methyl-1,5-pentanediol, and 1,6-hexanediol.

In the present embodiments, among the specified water-soluble organic solvents and the water-soluble organic solvents other than the specified water-soluble organic solvents described above, the use of solvents for which the HLB (Hydrophile-Lipophile Balance) value is not more than 8 is preferred. By using a water-soluble organic solvent having an HLB value of not more than 8, a water-based ink having particularly superior storage stability and discharge stability can be obtained. Among the specified water-soluble organic solvents, examples of solvents having an HLB value of not more than 8 include 1,2-butanediol, 1,3-butanediol, 1,4-butanediol, 2-methyl-1,3-propanediol, 3-methyl-1,3-butanediol, and 2,2-dimethyl-1,3-propanediol.

There are various methods for calculating the HLB value, including Griffin's method, Davies' method and the Kawakami method, but in the present embodiments, HLB value calculations are performed using Griffin's method. Griffin's method is a method that calculates the HLB value in accordance with formula (1) shown below, using the molecular weight of the target material. The smaller the HLB value, the higher the hydrophobicity of the material, whereas the larger the HLB value, the higher the hydrophilicity of the material.

HLB value=20×(sum of molecular weights of hydrophilic portions)÷(molecular weight of material)　　Formula (1):

In the water-based ink of the present embodiments, the amount of the specified water-soluble organic solvent is within a range from 15 to 50% by weight relative to the total weight of the water-based ink. This amount is preferably from 15 to 40% by weight, more preferably from 15 to 30% by weight, and most preferably from 20 to 30% by weight.

When the amount of the specified water-soluble organic solvent is at least 15% by weight, favorable balance can be achieved between the ink penetration into the substrate and the drying properties, while maintaining favorable moisture retention properties on the inkjet head, and therefore favorable printed image quality can be realized even during high-speed printing, with good maintenance of the discharge stability. Furthermore, when the above amount is not more than 50% by weight, the ink viscosity can be kept within a desirable range, making it easier to obtain favorable discharge stability. Moreover, although the details remain unclear, ensuring the amount is within a range from 15 to 40% by weight also yields improved ink storage stability.

Further, the specified water-soluble organic solvent may be used in combination with a water-soluble organic solvent other than the specified water-soluble organic solvent. The blend amount of the specified water-soluble organic solvent relative to the total weight of water-soluble organic solvent contained in the ink is preferably within a range from 50 to 100% by weight, more preferably from 60 to 100% by weight, and particularly preferably from 70 to 100% by weight. Provided the blend amount of the specified water-soluble organic solvent falls within this range, the effects of the specified water-soluble organic solvent described above can be favorably realized.

In addition, from the viewpoints of ensuring favorable manifestation of the effects described above, and obtaining an ink having superior discharge stability and storage stability, the amount of the alkanediol of at least 4 carbon atoms relative to the total weight of the water-soluble organic solvent is preferably within a range from 10 to 95% by weight, more preferably from 30 to 90% by weight, and particularly preferably from 50 to 85% by weight. This "amount of the alkanediol of at least 4 carbon atoms" used in the above calculation means the total of the amount of alkanediols of at least 4 carbon atoms included in the specified water-soluble organic solvent, and the amount of alkanediols of at least 4 carbon atoms included in water-soluble organic solvents other than the specified water-soluble organic solvent.

(Binder Resin)

As already mentioned above, the water-based inkjet ink of an embodiment of the present invention contains a binder resin. Known binder resins for use in inkjet inks include water-dispersible resin microparticles (hereafter also referred to as simply "resin microparticles") and water-soluble resins, and either of these types of binder resin may be selected and used in the water-based ink of the present embodiments, or a combination of both types may be used.

(Water-Dispersible Resin Microparticles)

Water-dispersible resin microparticles generally have larger molecular weights than water-soluble resins, and because the resin microparticles exists in a dispersed state within the ink, the blend amount can be increased compared with the case of water-soluble resins. Consequently, resin microparticles are also suited to enhancing the coating film durability of the printed matter.

However, in those cases where water-dispersible resin microparticles are used as the binder resin, consideration must be given to the minimum film forming temperature (MFT) of the water-dispersible resin microparticles. When water-dispersible resin microparticles having a low MFT are used, the MFT of the water-dispersible resin microparticles tends to decrease further due to the effects of the water-soluble organic solvent used in combination with the particles. As a result, fusion and/or aggregation of the water-dispersible resin microparticles may occur even at room temperature, resulting in an increased likelihood of blockages of the inkjet head nozzles. In order to avoid this problem, it is preferable that the MFT of the water-dispersible resin microparticles is set to a value of at least 60° C. by appropriate adjustment of the monomer components that form the water-dispersible resin microparticles and the blend amounts of those monomer components. The MFT value can be measured, for example, using an MFT Tester manufactured by Tester Sangyo Co., Ltd.

(Water-Soluble Resins)

On the other hand, water-soluble resins differ from water-dispersible resin microparticles in that the resin itself has solubility. Accordingly, as already described above, inks that contain a water-soluble resin as a binder resin do not suffer from instant precipitation and film formation of the resin component when used in combination with a water-soluble organic solvent having a low surface tension, or when the water volatilizes from the ink at the air-liquid interface. Accordingly, blockages of the inkjet head nozzles are less likely to occur, and superior discharge stability can be more easily achieved. For these reasons, a water-soluble resin is preferably used as the binder resin in the present embodiments.

The expression "water-soluble resin" used in the present embodiments is deemed to also include a form known as a "hydrosol". A hydrosol is a material in which a resin exists within an aqueous medium in a state where acidic and/or basic functional groups that exist within the resin structure are in a neutralized state, and is a material which although having particle-like properties, has at least a portion of the surface of those particles in a swollen and dissolved state.

A hydrosol can be obtained, for example, by synthesizing a resin in an organic solvent using a solution polymerization method or the like, subsequently neutralizing the resin with an amine or the like, and then adding the neutralized resin to an aqueous medium and performing a dispersion treatment. Alternatively, a hydrosol can be obtained by adding a solution of the above resin to an aqueous medium containing an amine or the like, and performing the neutralization and dispersion treatment simultaneously.

In the present embodiments, an example of a method that can be used for confirming whether the binder resin is a water-soluble resin or water-dispersible resin microparticles is a method that involves measuring the loading index described below.

In this description, the "loading index" means a value calculated from the total amount of scattered light when a laser light is irradiated onto an aqueous solution of the binder resin as a sample. In the case of a water-soluble resin of an embodiment of the present invention, it is thought that because at least a portion of the resin either dissolves in the water or swells, the scattering that occurs at the resin surface within the liquid weakens. For this reason, the solubility of the resin in water can be judged on the basis of the loading index value. Typically, a binder resin for which the above value is 10 or less can be considered to be at least partially dissolved in the water, and can be used favorably as the binder resin of the present embodiments.

The loading index value can be confirmed, for example, using a dynamic light scattering particle size distribution analyzer UPA-EX150, manufactured by MicrotracBEL Corporation, using the method described below. First, in an atmosphere at 25° C., water is used as a dispersion medium to perform a "set zero" (background measurement). Next, an aqueous solution of the binder resin prepared so that the solid fraction concentration is 10% by weight is placed in the sample cell of the apparatus. Once the liquid surface of the aqueous solution has settled, sample loading is performed, and the displayed loading index value is checked.

The binder resin used in the water-based ink of an embodiment of the present invention is preferably a copolymer containing a structural unit having a carboxyl group and a structural unit having an alkyl group. As described above, this is because this type of binder resin functions as a surfactant having carboxyl groups that function as hydrophilic units and alkyl groups that function as hydrophobic units, and can yield printed matter having excellent printed image quality and drying properties even on low-absorption substrates.

Examples of the method used for obtaining a binder resin having the above structure include a method of synthesizing the binder resin using a monomer having a carboxyl group and a monomer having an alkyl group, and a method in which a monomer having a carboxyl group and/or a resin containing a structural unit having a carboxyl group is grafted to a resin having alkyl groups, and either of these methods may be selected.

Examples of the monomer having a carboxyl group, in those cases where the binder resin has a (meth)acrylic structure, include (meth)acrylic acid, crotonic acid, angelic acid, carboxymethyl (meth)acrylate, carboxyethyl (meth)acrylate, (meth)acryloyloxyethylsuccinic acid, (meth)acryloyloxyethylphthalic acid, and (meth)acryloyloxyethylhexahydrophthalic acid;

in those cases where the binder resin is a urethane resin, include 2,2-dimethylolpropionic acid, 2,2-dimethylolbutanoic acid, 2,2-dimethylolbutyric acid, and 2,2-dimethylolvaleric acid;

and in those cases where the binder resin has a styrene structure, include carboxystyrene.

One type of the above compounds may be used alone, or a combination of two or more types of compound may be used. In this description, "(meth)acrylic" means at least one of "acrylic" and "methacrylic", whereas "(meth)acryloyl" means at least one of "acryloyl" and "methacryloyl".

Further, the alkyl group mentioned above refers specifically to an alkyl group of 8 to 36 carbon atoms, preferably an alkyl group of 10 to 30 carbon atoms, more preferably an alkyl group of 12 to 26 carbon atoms, and particularly preferably an alkyl group of 18 to 24 carbon atoms. A binder resin containing a structural unit having an alkyl group containing this number of carbon atoms exhibits favorable functionality as a surfactant, enables printed matter of particularly superior printed image quality to be obtained, and exists in a stable manner within the ink, and is consequently preferred.

The alkyl group may have a linear structure, a branched structure or a cyclic structure, but preferably has a linear structure. Examples of linear alkyl groups include an octyl group (C8), nonyl group (C9), decyl group (C10), lauryl group (C12), myristyl group (C14), cetyl group (C16), stearyl group (C18), arachyl group (C20), behenyl group (C22), lignoceryl group (C24), cerotoyl group (C26), montanyl group (C28), melissyl group (C30), dotriacontanoyl group (C32), tetratriacontanoyl group (C34), and hexatriacontanoyl group (C36).

Examples of the resins having the above alkyl groups include (meth)acrylic resins, styrene-(meth)acrylic resins, urethane resins, styrene-butadiene resins, vinyl chloride resins, and polyolefin resins. An aforementioned monomer having a carboxyl group and/or a resin containing a structural unit having a carboxyl group may be grafted to any of these resins using a conventional method.

In the present embodiments, as mentioned above, the binder resin is preferably a water-soluble resin. Accordingly, when a resin having the structure described above is used, the carboxyl groups that exists in the resin are preferably neutralized with a basic compound to make the resin water-soluble. Examples of basic compounds that may be used include alkanolamines such as monoethanolamine, diethanolamine, triethanolamine, dimethylaminoethanol, and 2-amino-2-methylpropanol; ammonia; and alkali metal hydroxides such as lithium hydroxide, sodium hydroxide and potassium hydroxide. Among these, in terms of the compatibility with the binder resin, which is an organic compound, one of the alkanolamines listed above or ammonia is preferably used.

In the present embodiments, examples of the types of binder resins that may be used include (meth)acrylic resins, styrene-(meth)acrylic resins, urethane resins, styrene-butadiene resins, vinyl chloride resins, and polyolefin resins. Among these, if due consideration is given to the ink storage stability, improving the coating film durability of the printed matter, and ready material availability, a (meth)acrylic resin and/or a styrene-(meth)acrylic resin can be used favorably, and selection of a styrene-(meth)acrylic resin is particularly desirable. Although not a particular limitation, in those cases where a styrene-(meth)acrylic resin is used as the binder resin, the blend ratio (weight ratio) of (styrene-based structural units):(structural units having a carboxyl group):(structural units having an alkyl group):(other structural units) is preferably within a range from 0 to 35:0.5 to 15:0.5 to 50:0 to 99 (provided the total is 100), and is more preferably within a range from 3 to 20:1 to 10:1 to 25:45 to 95.

Further, in the present embodiments, either resins synthesized by conventional synthesis methods or commercially available products may be used as the binder resin. Furthermore, there are no particular limitations on the structure of the resin, and resins having various structures such as random structures, block structures, comb-like structures and star-like structures may be used as desired. Among these, in the present embodiments, by using a structure in which the region that functions as the hydrophilic unit and the region that functions as the hydrophobic unit are clearly distinguishable within the molecule, the functionality as a surfactant described above manifests more favorably, and viscosity increases at the air-liquid interface are less likely to occur, meaning the discharge stability can be improved. Moreover, although detailed reasons remain unclear, from the viewpoint of achieving a combination of void suppression and superior drying properties, a resin having a block structure or a comb-like structure is preferred, and a resin having a block structure is particularly desirable.

In the present embodiments, the weight average molecular weight (Mw) of the binder resin is preferably within a range from 5,000 to 25,000, more preferably from 7,500 to 23,000, and particularly preferably from 10,000 to 20,000. In those cases where the weight average molecular weight has been adjusted to a value of at least 5,000, favorable coating film durability can be more easily obtained on the printed matter. Further, when the weight average molecular weight has been adjusted to a value of not more than 25,000, the discharge stability from the inkjet head can be more easily kept in a favorable state.

Furthermore, when a water-soluble resin is used as the binder resin, the molecular weight distribution for the resin is preferably small. If the molecular weight distribution is large, then the proportions of high-molecular weight components and low-molecular weight components that may sometimes have adverse effects on the discharge stability and the printed image quality increase. For example, ink discharge faults or discharge delays and voids caused by high-molecular weight components, and a deterioration in the coating film durability caused by low-molecular weight components tend to occur more readily. Accordingly, by using a water-soluble resin having a small molecular weight distribution, any deterioration in the printed image quality can be suppressed.

In the present embodiments, a resin for which the molecular weight distribution width represented by the ratio (Mw/Mn) of the weight average molecular weight (Mw) relative to the number average molecular weight (Mn) is within a range from 1.0 to 2.5 is preferably used as the binder resin. Further, the molecular weight distribution width of the binder resin is particularly preferably within a range from 1.0 to 2.0. When the molecular weight distribution width of the binder resin falls within the above range, the discharge stability including during the initial printing period can be more easily improved. Further, superior image quality and excellent coating film durability can be more easily obtained for the printed matter.

This is because binder resins having a smaller molecular weight distribution width represented by Mw/Mn contains smaller amounts of high-molecular weight components and low-molecular weight components. In other words, it is thought that by using a water-soluble resin having a small molecular weight distribution width and a small amount of high-molecular weight components, ink viscosity increases at the air-liquid interface can be more easily suppressed. In this manner, by using a binder resin having a molecular weight distribution width that falls within the above range, the occurrence of discharge delays can be suppressed, and the discharge stability can be further enhanced. Further, during printing, ink fluidity can be maintained even during solvent volatilization, wet spreading can be improved, enabling the formation of uniform dots, and printed matter of excellent printed image quality with no voids or the like can be obtained. Moreover, by using a resin having a molecular weight distribution width within the desired range, namely a resin having a small amount of low-molecular weight components, as the binder resin, printed matter having satisfactory coating film durability can be obtained.

The weight average molecular weight and the number average molecular weight of the binder resin can be measured using typical methods. For example, the weight average molecular weight can be measured as a polystyrene-equivalent value using a TSKgel column (manufactured by Tosoh Corporation) and a GPC (HLC-8120GPC, manufactured by Tosoh Corporation) fitted with an RI detector, using THF as the eluent.

In the present embodiments, the acid value of the binder resin is at least 5 mgKOH/g but less than 60 mgKOH/g, preferably from 5 to 50 mgKOH/g, more preferably from 5 to 40 mgKOH/g, and even more preferably from 5 to 35 mgKOH/g. When the acid value is at least 5 mgKOH/g, the ink can be redissolved even after solidifying at the air-liquid interface, meaning blockages of the inkjet head nozzles can be suppressed, and the discharge stability can be more easily improved. Further, when the acid value is less than 60 mgKOH/g, printed items having various superior coating film durability properties such as excellent water resistance can be more easily obtained, and the storage stability of the ink also improves. Moreover, the inventors of the present invention discovered that when a water-soluble resin having an acid value of at least 5 mgKOH/g but less than 60 mgKOH/g was used, the discharge stability in the initial printing period were particularly favorable. Although the detailed reasons for this finding are unclear, it is thought that the above water-soluble organic solvent forms hydrogen bonds via the acid groups within the binder resin, enabling the viscoelasticity of the ink to adopt a favorable state.

In this description, the "acid value" means the number of milligrams of potassium hydroxide (mgKOH/g) required to neutralize the acidic components contained within a 1 g sample. In the present embodiments, the acid value of the binder resin may be calculated from the composition of monomers that form the resin, or may be measured experimentally. In one example of a method for measuring the acid value experimentally, a solution of the sample is titrated with an ethanolic solution of potassium hydroxide (0.1 mol/L) using an automatic potentiometric titrator AT-710S manufactured by Kyoto Electronics Manufacturing Co., Ltd. Following completion of the titration, the acid value is calculated from the amount of the ethanolic solution added to reach the end point.

In the present embodiments, by increasing the glass transition point temperature (Tg) of the binder resin, various coating film durability properties can be further enhanced. Specifically, the glass transition point temperature is preferably within a range from 30 to 110° C., and more preferably within a range from 50 to 100° C. When the glass transition point temperature is at least 30° C., an ink having various superior coating film durability properties including water resistance can be more easily obtained, and peeling of the printing from the printed matter can be suppressed in actual applications. Further, when the glass transition point temperature is not more than 110° C., the occurrence of cracking or splitting of the printed surface when the printed matter is folded can be suppressed.

In the present embodiments, the glass transition temperature can be determined using the formula (2) shown below.

$$1/Tg = \Sigma(Wn/Tgn) \quad \text{Formula (2):}$$

In the above formula (2), Tg represents the glass transition temperature (K) of the polymer or each block, Wn represents the mass fraction of each structural unit contained in the polymer or block, and Tgn represents the glass transition temperature (K) of a homopolymer of each structural unit. These Tgn values may, for example, use the values disclosed in "Polymer Handbook (fourth edition)" edited by J. Brandrup et al., published by John Wiley & Sons, Inc., 1998.

The amount of the binder resin, relative to the total weight of the ink, is preferably at least 2.0% by weight, more preferably at least 2.5% by weight, and particularly preferably 3.0% by weight or greater. On the other hand, the amount is preferably not more than 10% by weight, more preferably not more than 8.0% by weight, and particularly preferably 6.0% by weight or less. When the amount added of the binder resin is at least 2.0% by weight, the functionality of the binder resin as a surfactant manifest satisfactorily, meaning an ink having superior printed image quality and drying properties can be obtained. Moreover, an ink that also exhibits excellent coating film durability is obtained. Further, when the amount added of the binder resin is not more than 10% by weight, the ink viscosity can be more easily adjusted to a value within the desired range, and an ink having superior discharge stability and coating film durability can be more easily obtained.

(Pigment Dispersion)

The water-based ink of an embodiment of the present invention preferably uses a pigment dispersion when blending the pigment. A "pigment dispersion" means a mixed liquid containing at least a pigment and an aqueous medium, wherein the pigment is dispersed stably within the aqueous medium. Further, an "aqueous medium" means a medium composed of a liquid that contains at least water, whereas the expression "dispersed stably" means the pigment exists in a uniform state and does not undergo aggregation or the like even as time elapses. Specifically, when the pigment dispersion is stored for one week in a thermostatic chamber at 50° C. and the volume average particle size (D50) is measured before and after the storage period, provided that the absolute value of the change in the volume average particle size is not more than 20%, the pigment dispersion can be adjudged to have the pigment dispersed stably within the aqueous medium. The volume average particle size represents the median size measured using a Nanotrac UPA-EX150 manufactured by MicrotracBEL Corporation, with the sample diluted with water as required.

In the present embodiments, examples of the method used for producing the pigment dispersion include (1) a method of dispersing a pigment having functional groups on the surface (a self-dispersing pigment) in the aqueous medium without using a pigment dispersant, (2) a method of dispersing the pigment in the aqueous medium using a pigment dispersing resin or a pigment dispersion surfactant as a pigment dispersant, and (3) a method of coating at least a portion of the pigment surface with a water-soluble resin and then performing dispersion in the aqueous medium. Among these, from the viewpoint of obtaining an ink that exhibits improved gloss for the printed matter, and also has excellent storage stability and discharge stability, in the present embodiments, the pigment dispersion is preferably a dispersion produced using the method (2) described above, and preferably contains a pigment that has been dispersed using a pigment dispersing resin as the pigment dispersant.

(Pigment)

The pigment used in the water-based ink of the present embodiments may be either an inorganic pigment or an organic pigment. Examples of the inorganic pigment include titanium oxide, zinc oxide, zinc sulfide, white lead, calcium carbonate, precipitated barium sulfate, white carbon, alumina white, kaolin clay, talc, bentonite, black iron oxide, cadmium red, red iron oxide, molybdenum red, molybdate orange, chrome vermilion, chrome yellow, cadmium yellow, yellow iron oxide, titanium yellow, chromium oxide, viridian, titanium cobalt green, cobalt green, cobalt chrome green, Victoria green, ultramarine blue, Prussian blue, cobalt blue, cerulean blue, cobalt silica blue, cobalt zinc silica blue, manganese violet and cobalt violet.

Further, examples of the organic pigment include azo pigments, phthalocyanine pigments, anthraquinone pigments, quinacridone pigments, isoindolinone pigments, quinophthalone pigments, dye lake pigments and fluorescent pigments. Specific examples, listed in terms of their color index values, are as follows.

Examples of cyan pigments include C. I. Pigment Blue 1, 2, 3, 10, 11, 14, 15:1, 15:3, 15:4, 15:6, 16, 18, 19, 21, 22, 56, 57, 60, 61, 64 and 66.

Examples of magenta pigments include C. I. Pigment Red 5, 7, 9, 12, 31, 48, 49, 52, 53, 57, 83, 84, 85, 89, 97, 112, 120, 122, 123, 146, 147, 149, 150, 168, 170, 177, 178, 179, 184, 185, 188, 194, 195, 196, 202, 206, 207, 209, 224, 238, 242, 254, 255, 260, 264, 269 and 282, and C. I. Pigment Violet 19, 23, 29, 30, 32, 36, 37, 38, 40 and 50.

Examples of yellow pigments include C. I. Pigment Yellow 1, 2, 3, 12, 13, 14, 16, 17, 20, 23, 24, 74, 83, 86, 93, 94, 95, 97, 108, 109, 110, 115, 117, 120, 125, 128, 129, 137, 138, 139, 147, 148, 150, 151, 154, 155, 166, 168, 180, 185, 192, 193, 199, 202 and 213.

Further, examples of black pigments include carbon blacks produced by the furnace method or the channel method. For example, among these, carbon blacks having properties including a primary particle size of 11 to 40 nm, a specific surface area measured by the BET method of 50 to 400 m$^2$/g, a volatile fraction of 0.5 to 10% by weight, and a pH value of about 2 to 10 are preferred.

Examples of commercially available products having these types of properties include No. 33, 40, 45, 52, 900, 2200B, 2300, MA7, MA8 and MCF88 (all manufactured by Mitsubishi Chemical Corporation); RAVEN 1255 (manufactured by Columbian Chemicals Co., Inc.); REGA 330R, 400R and 660R, MOGUL L, and ELFTEX 415 (all manufactured by Cabot Corporation); and Nipex 90, Nipex 150T, Nipex 160IQ, Nipex 170IQ, Nipex 75, Printex 85, Printex 95, Printex 90, Printex 35 and Printex U (all manufactured by Evonik Japan Co., Ltd.). Any of these listed commercially available products can be used favorably.

In the present embodiments, besides the carbon blacks mentioned above, pigments such as aniline black, Lumogen black, and azomethine azo black can also be used as the black pigment. Further, a plurality of color pigments such as the cyan pigments, magenta pigments and yellow pigments described above, and special color pigments such as the brown pigments and orange pigments described below, may also be used to form a black pigment.

Examples of pigments other than the cyan, magenta, yellow and black pigments described above include C. I. Pigment Green 7, 8, 10, 36 and 47; C. I. Pigment Brown 3, 5, 25 and 26; and C. I. Pigment Orange 2, 5, 7, 13, 14, 15, 16, 24, 34, 36, 38, 40, 43, 62, 63, 64, 71, 72 and 73.

The amount of the pigment, relative to the total weight of the water-based ink, is preferably at least 0.1% by weight but not more than 15% by weight, more preferably at least 0.5% by weight but not more than 10% by weight, and particularly preferably at least 1% by weight but not more than 8% by weight.

As mentioned above, in the present embodiments, a pigment having functional groups on the surface may be used as a self-dispersing pigment. In the present embodiments, pigment dispersions may be produced using self-dispersing pigments produced using conventional methods such as the methods disclosed in JP H09-151344 A, JP H10-510861 A, JP H11-323229 A and JP 2003-535949 A, and/or using commercially available self-dispersing pigments. Further, commercially available self-dispersing pigment dispersions may be used, as is, as the pigment dispersion in the present embodiments. Examples of commercially available self-dispersing pigment dispersions include the CAB-O-JET (a registered trademark) series manufactured by Cabot Corporation, and AQUA-BLACK (a registered trademark) 162 and the like manufactured by Tokai Carbon Co., Ltd.

(Pigment Dispersing Resin)

In those cases where a pigment dispersing resin is used in the water-based ink of an embodiment of the present invention, there are no particular limitations on the type of pigment dispersing resin used, and for example, one or more types of resin selected from among (meth)acrylic resins, styrene-(meth)acrylic resins, maleic acid resins, styrene-maleic acid resins, urethane resins, ester resins, amide resins, and imide resins and the like may be used. Among these, from the viewpoints of achieving more powerful adsorption of the pigment, thereby better stabilizing the pigment dispersion, as well as also improving the discharge stability in combination with the specified water-soluble organic solvent, one or more types of resin selected from the group consisting of (meth)acrylic resins, styrene-(meth)acrylic resins, urethane resins and ester resins is preferred. Furthermore, there are no particular limitations on the structure of these resins, and resins having random structures, block structures, comb-like structures and star-like structures may all be used as desired. The pigment dispersing resin used in an embodiment of the present invention may be either a water-soluble resin or a water-insoluble resin, but from the viewpoint of dramatically improving the ink storage stability, a water-soluble resin is preferably selected. The determination as to whether the pigment dispersing resin is a water-soluble resin or a water-insoluble resin may be conducted using the method described above that uses the loading index value.

The pigment dispersing resin used in the present embodiments preferably has an alkyl group of 10 to 36 carbon atoms within the resin skeleton. When a pigment dispersing resin having this type of alkyl group is used, favorable results can be more easily obtained in terms of the ink storage stability and the compatibility with the binder resin. One example of a method for synthesizing a resin having an alkyl group is a method that involves performing a condensation of an alcohol and/or amine having an alkyl group with a functional group such as a carboxylic acid within the resin skeleton of the base structure. Another method involves using a monomer having an alkyl group at the time of resin synthesis to synthesize a resin containing the alkyl group.

In terms of the molecular weight of the pigment dispersing resin, the weight average molecular weight is preferably at least 1,000 but not more than 100,000, and is more preferably at least 5,000 but not more than 50,000. By ensuring that the weight average molecular weight falls within this range, the pigment can be stably dispersed in water. Further, favorable discharge stability can be more easily achieved. The weight average molecular weight of the pigment dispersing resin can be measured in the same manner as that described above for the binder resin.

The acid value of the pigment dispersing resin is preferably within a range from 100 to 400 mgKOH/g. Provided the acid value is at least 100 mgKOH/g, the pigment dispersing resin can be more easily dissolved in water, and the viscosity of the dispersion can be suppressed to a low level. Further, provided the acid value is not higher than 400 mgKOH/g, favorable interactions can be achieved with surfactants, and any increases in the ink viscosity can be prevented. Moreover, inks that use a pigment dispersing resin having an acid value that falls within the above range also exhibit excellent discharge stability and storage stability. The acid value of the pigment dispersing resin is preferably from 120 to 350 mgKOH/g, and more preferably from 150 to 300 mgKOH/g.

In order to enhance the degree of solubility in water, a pigment dispersing resin in which the functional groups within the resin have been neutralized is preferred. Specifically, examples of bases that may be used to neutralize acid groups include organic bases such as ammonia water, dimethylaminoethanol, diethanolamine and triethanolamine, and inorganic bases such as lithium hydroxide, sodium hydroxide and potassium hydroxide.

The blend ratio of the pigment dispersing resin relative to the pigment is preferably within a range from 1 to 50% by weight. By adjusting the ratio of the pigment dispersing resin to a value within this range, the viscosities of the pigment dispersion and the ink can be kept low, and the storage stability and discharge stability of the ink can be improved. The blend ratio of the pigment dispersing resin relative to the pigment is more preferably from 2 to 45% by weight, even more preferably from 4 to 40% by weight, and most preferably from 5 to 35% by weight.

The pigment dispersing resin is distinguished from the binder resin described above on the basis of the number of functional groups capable of adsorbing to the pigment. In this description, the pigment dispersing resin is a resin having a proportion of structural units containing an aromatic ring structure that is at least 25% by weight relative to the total weight of the resin, and/or having an acid value greater than 100 mgKOH/g. In contrast, in this description, a resin that does not satisfy the above requirements, namely a resin having a proportion of structural units containing an aromatic ring structure that is less than 25% by weight relative to the total weight of the resin, and/or having an acid value of 100 mgKOH/g or less, is deemed a binder resin.

The weight of structural units containing an aromatic ring structure is calculated, for example, from the amount of monomer components containing an aromatic ring structure used in the production of the resin.

(Water)

The water included in the ink of the present embodiments is preferably not a typical water containing various ions, and the use of an ion-exchanged water (deionized water) is preferred. The amount of water in the ink is preferably within a range from 20 to 90% by weight relative to the total weight of the ink.

(Surfactants)

The water-based inkjet ink according to an embodiment of the present invention may use a surfactant (hereafter sometimes referred to as an "active agent") for the purpose of adjusting the surface tension, and ensuring favorable wet spreading on the substrate, and particularly on low-absorption substrates. Various types of surfactants are known, including acetylene-based, siloxane-based, acrylic-based and fluorine-based surfactants, which may be selected in accordance with the application, but from the viewpoint of satisfactorily lowering the surface tension of the ink and ensuring excellent wet spreading, the use of at least an acetylene-based surfactant and/or a siloxane based surfactant is preferred.

In those cases where an acetylene-based surfactant is used, the use of a compound represented by general formula (3) shown below is preferred. Examples of commercially available products of the compounds represented by general formula (3) include Surfynol (a registered trademark) 104, Surfynol 420, Surfynol 440, Surfynol 465, Surfynol DF110D, Dynol (a registered trademark) 604 and Dynol 607, all manufactured by Air Products and Chemicals, Inc. Further, compounds synthesized, for example, using the method disclosed in JP 2002-356451 A may also be used.

General formula (3)

[Chemical formula 1]

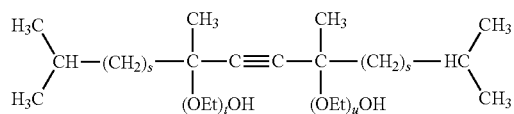

In general formula (3), s represents an integer of 0 to 3, and t+u represents an integer of 0 to 20. Further, Et represents an ethylene group.

In those cases where a siloxane-based surfactant is used, from the viewpoint of the compatibility with the water-soluble organic solvent, the use of a polyether-modified siloxane-based surfactant is preferred. Polyether-modified siloxane-based surfactants are classified as side chain-type surfactants, both terminal-type surfactants, single terminal-type surfactants, or side chain and both terminal-type surfactants depending on the location(s) at which the polyether group is introduced into the siloxane chain, and in the case of use in an embodiment of the present invention, from the viewpoint of compatibility, selection of a side chain-type and/or both terminal-type polyether-modified siloxane-based surfactant is preferred, and selection of a both terminal-type polyether-modified siloxane-based surfactant is particularly preferred.

As mentioned above, in those formulations where an alkanediol of not more than 3 carbon atoms is used as the specified water-soluble organic solvent, from the viewpoint of compensating for the high surface tension of the alkanediol of not more than 3 carbon atoms, and ensuring favorable images with no voids regardless of the substrate, combining the alkanediol with the surfactant described above is particularly desirable. In such cases, from the viewpoints of ensuring that the orientation at the air-liquid interface and the substrate-ink interface is rapid, enabling a dramatic improvement in the ink wet spreading properties, and ensuring that dot coalescence can be favorably suppressed, the selection of an acetylene-based surfactant represented by general formula (3) is preferred, and selection of a compound of the general formula (3) in which s is 1 or 2, and t+u represents an integer of 0 to 15 is particularly desirable.

The total amount of added surfactant, relative to the total weight of the ink, is preferably at least 0.1% by weight but not more than 5% by weight, and is more preferably at least 0.2% by weight but not more than 4% by weight. Further, in those cases where an acetylene-based surfactant and a siloxane-based surfactant are combined, the blend amount of the siloxane-based surfactant relative to the blend amount of the acetylene-based surfactant is preferably within a range from 30 to 500% by weight, more preferably from 60 to 450% by weight, even more preferably from 90 to 400% by weight, and particularly preferably from 120 to 350% by weight.

(Other Components)

In addition to the components described above, a pH adjuster may be added as required to the water-based inkjet ink of the present embodiments. Any material having a pH adjustment function may be selected as desired. In those cases where the ink is made more basic, examples of materials that may be used include alkanolamines such as monoethanolamine, diethanolamine, triethanolamine, dimethylaminoethanol, and 2-amino-2-methylpropanol; ammonia; alkali metal hydroxides such as lithium hydroxide, sodium hydroxide and potassium hydroxide; and alkali metal carbonates such as lithium carbonate, sodium carbonate, sodium hydrogen carbonate and potassium carbonate. Further, in those cases where the ink is made more acidic, examples of materials that may be used include hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid and glutamic acid. One of the above pH adjusters may be used alone, or a combination of two or more pH adjusters may be used.

The blend amount of the pH adjuster, relative to the total weight of the water-based inkjet ink, is preferably from 0.01 to 5% by weight, more preferably from 0.1 to 3% by weight, and most preferably from 0.2 to 1.5% by weight. By adjusting the blend amount to a value within the above range, pH variation caused by the dissolution of atmospheric carbon dioxide or the like can be prevented.

Moreover, in order to obtain an ink having certain desired physical property values, in addition to the various components described above, appropriate amounts of additives such as thickeners, preservatives, infrared absorbers and ultraviolet absorbers may be added to the water-based ink of an embodiment of the present invention. In such cases, the blend amount of these additives, relative to the total weight of the ink, is preferably at least 0.01% by weight but not more than 10% by weight, more preferably at least 0.05% by weight but not more than 5% by weight, and even more preferably at least 0.1% by weight but not more than 3% by weight.

(Method for Preparing Ink)

Examples of methods for preparing an ink of an embodiment of the present invention containing the types of components described above are described below, but the method for preparing an ink of an embodiment of the present invention is not limited to these particular methods.

(I. Preparation of Pigment Dispersion (in the Case a Pigment Dispersing Resin is Used))

The pigment, water and pigment dispersing resin are mixed and stirred (premixing step), and a dispersion treatment is then performed using a dispersion device described below as required (dispersion step). Further, if required, a filtration treatment using a filter or the like and/or a centrifugal separation treatment may be performed, yielding a pigment dispersion. At least a portion of the binder resin may be added during the above premixing step and/or dispersion step.

The dispersion device used in the above dispersion treatment may be any typically used dispersion device, and examples include a ball mill, roll mill, sand mill, beads mill, paint shaker and microfluidizer. Among these, a beads mill can be used particularly favorably.

Because the ink of the present embodiments is for inkjet use, from the viewpoint of preventing blockages of the inkjet head nozzles, the particle size distribution of the pigment is preferably optimized. Examples of methods that may be used for obtaining a pigment having the desired particle size distribution include methods in which an aforementioned filtration treatment and/or centrifugal separation treatment is introduced, as well as methods in which the diameter of the grinding media in the dispersion device is reduced, methods in which the fill ratio of the grinding media is increased, methods in which the dispersion treatment time is lengthened, or combinations of a plurality of these methods. The particle size distribution of the ink can be measured in the same manner as described above for the volume average particle size (D50) of the pigment dispersion.

(II. Preparation of Ink)

Next, the binder resin, the water-soluble organic solvent, water, and any of the surfactants, pH adjusters and/or additive components mentioned above that are required are added to the above pigment dispersion and stirred thoroughly. By subsequently performing a filtration treatment as required, an ink of an embodiment of the present invention can be obtained.

During the above stirring, in order to achieve a more uniform mixture, the mixture may be heated. In such a case, the liquid temperature of the mixture is preferably no higher than the glass transition temperature of the binder resin being used.

Further, examples of the method used for the above filtration treatment include pressurized filtration, reduced-pressure filtration, and centrifugal filtration and the like, and a plurality of these methods may also be combined. In those cases where a filter is used in a pressurized filtration or reduced-pressure filtration, the pore size of the filter is preferably from 0.3 to 2.5 μm.

(Ink Viscosity)

The ink of the present embodiments preferably has a viscosity at 25° C. of 1 to 20 mPa·s. Provided the viscosity is within this range, favorable discharge properties from the inkjet head can be more easily maintained. The viscosity is more preferably from 2 to 15 mPa·s, and even more preferably from 3 to 12 mPa·s. The viscosity can be measured using an E-type viscometer TVE-20L, manufactured by Toki Sangyo Co., Ltd., under conditions including a temperature of 25° C. and a rotational rate of 50 rpm.

(Ink Surface Tension)

Furthermore, the surface tension of the ink of the present embodiments is preferably within a range from 20 to 35 mN/m, more preferably from 21 to 32 mN/m, and particularly preferably from 22 to 30 mN/m. Provided the surface tension falls within this range, printed matter having excellent printed image quality with no voids can be obtained. The surface tension can be measured in the same manner as that described above for the surface tension of the water-soluble organic solvent.

<Production Method for Printed Matter>

Printed matter using the water-based inkjet ink of an embodiment of the present invention is preferably produced using a method that includes a step of applying the water-based inkjet ink described above to a substrate being transported at a speed of at least 30 m/minute using a line pass type inkjet printing system, and a step of applying thermal energy to the substrate to dry the water-based inkjet ink.

Generally, the method used for printing inkjet inks is a method in which the ink is discharged from the nozzles of an inkjet head, and the ink droplets are adhered to a substrate. The inkjet printers housing the inkjet head and used for the printing process can be broadly classified into two main types based on the printing system employed. One type is the "shuttle scan type" in which the head is moved back and forth over the printing substrate while discharging the ink, and the other type is a "line pass type" in which the position of the head that discharges the ink is fixed, and the printing substrate is passed beneath the head while the ink is discharged.

Compared with the shuttle scan type, line pass type printers are more capable of high-speed printing, and can be expected to act as effective replacements for existing high-speed printers such as offset printing devices. However, the flushing that is performed in shuttle scan type printers cannot be performed, and depending on the pattern being printed, nozzles from which ink is not discharged for a long time can sometimes occur, meaning discharge faults are more likely to occur than shuttle scan type systems. In this manner, particularly in the case of line pass type printers, resolving this tradeoff between increased printing speed and suppression of discharge faults is an important issue.

On the other hand, as described above, the water-based inkjet ink according to an embodiment of the present invention exhibits excellent discharge stability and produces superior printed image quality for the printed matter. Accordingly, the water-based inkjet ink of an embodiment of the present invention can be used particularly favorably in line pass type inkjet printing methods.

(Printing Speed)

When producing printed matter using the water-based ink of the present embodiments, in order to provide an alternative to existing high-speed printers, the printing speed is preferably at least 30 m/minute, more preferably at least 50 m/minute, and particularly preferably 75 m/minute or greater.

(Inkjet Head Used in Inkjet Printing System)

Examples of the method used for discharging the water-based ink from the inkjet head include piezo methods that utilize the deformation of a piezo element, thermal methods that use gas bubbles generated by heating the water-based ink, and electrostatic methods in which an electric charge opposite to that of the water-based ink is applied to the substrate and electrostatic attraction is used to achieve discharge, and any of these methods may be used in the present embodiments. In the present embodiments, among the above methods, a piezo method is preferably employed. Although the details remain unclear, a water-based ink of an embodiment of the present invention containing a binder resin having the desired acid value has favorably viscoelasticity, and is able to compensate for the smallness of the energy imparted to the ink during discharge, which is one drawback of the piezo method, meaning stable discharge can be achieved. Furthermore, the piezo method does not require heat or an electric charge to be applied to the ink, meaning further improvement in the discharge stability can be realized, and this point also favors selection of a piezo method.

(Application of Thermal Energy in Inkjet Ink Drying Step)

Following application of the water-based ink of an embodiment of the present invention to a substrate, thermal energy is preferably applied to the substrate to dry the water-based ink. There are no particular limitations on the method used for applying the thermal energy in the present invention, and examples include heated drying methods, hot air drying methods, infrared (IR) drying methods, microwave drying methods and drum drying methods. Any of the above drying methods may be used alone, or a combination of a plurality of methods may be used.

Among these methods, from the viewpoints of preventing damage to the substrate and bumping of the water-soluble organic solvent in the water-based ink, an infrared irradiation method in which the substrate is dried by irradiation with infrared rays is preferably employed. In such a case, it is preferable that at least 50% of the total output integral of the infrared rays used for the infrared irradiation exists in a wavelength region from at least 700 nm to not more than 1,500 nm. Further, from the viewpoint of removing the vapor of the liquid components generated by the infrared irradiation and drying, thereby further improving the drying properties, an airflow is preferably created near the surface of the substrate during the infrared drying process.

(Substrate)

There are no particular limitations on the types of substrate on which the water-based inkjet ink of an embodiment of the present invention can be used, and conventional printing substrates typical of this technical field may be used. Examples include paper substrates such as high-quality papers, coated papers, art papers, cast papers, synthetic papers, and special inkjet papers; plastic substrates such as polyvinyl chloride, polyethylene terephthalate (PET), polypropylene (PP), polyethylene (PE), nylon, polystyrene, foamed styrol, polymethyl methacrylate (PMMA) and polycarbonate; glass substrates; and fabric substrates and the like. The surfaces of these printing substrates may be smooth, or may have unevenness. Further, the printing substrate may be transparent, semi-transparent or opaque. Moreover, there are no particular limitations on the shape of the printing substrate, and examples include film-like, sheet-like and plate-like substrates. A substrate in which two or more types of printing substrates have been bonded together may also be used as the printing substrate. Moreover, a functional layer such as an adhesive layer, the surface of which has been protected with a release sheet or the like, may be provided on the opposite side from the printing surface, or a functional layer such as an adhesive layer may be provided on the printed surface following printing.

The water-based inkjet ink of the present embodiments is also suitable for printing to low-absorption substrates typified by coated paper substrates such as coated papers, art papers and cast papers, and plastic substrates such as polyvinyl chloride sheets, PET films, PP films, PE films and nylon films. The expression "low-absorption substrate" means a substrate that either absorbs no water or has a slow absorption rate, and when a conventional water-based ink is used to perform printing to this type of substrate having low water absorption, color boundary bleeding and mottling often occur. However, in the case of a water-based inkjet ink of an embodiment of the present invention, the suppression effect on these phenomena due to the orientation at the ink droplet interface means that printed matter of excellent printed image quality can be obtained. In other words, a water-based inkjet ink is obtained that exhibits excellent printed image quality on all manner of printing substrates.

Whether or not a substrate is a low-absorption substrate can be determined on the basis of the water absorption coefficient measured by Bristow's method (J. TAPPI paper pulp test method No. 51-87). Specifically, using an Auto Scan absorption meter manufactured by Kumagai Riki Kogyo Co., Ltd. and water, a relationship plot is generated between the amount of water absorption (ml/m$^2$) obtained in a contact time of 100 to 1,000 milliseconds and the square root of the contact time (msec$^{1/2}$), the gradient of the straight line is calculated by the least squares method, and this gradient is deemed to represent the absorption coefficient. In the present embodiments, substrates for which this absorption coefficient is within a range from 0 to 0.6 ml/m$^2$ msec$^{1/2}$ are adjudged to be low-absorption substrates.

Among the various possibilities, the water-based inkjet ink of the present embodiments is preferably used on a substrate having a 60° gloss of 40 or higher. By using a substrate for which the 60° gloss is 40 or higher, high-quality printed matter having a glossy appearance can be obtained.

Further, in general, substrates having a high 60° gloss tend to exhibit lower water absorption, and are more prone to drying problems. In contrast, as described above, the water-based inkjet ink of the present embodiments exhibits excellent drying properties, and can therefore also be used favorably on substrates having a high 60° gloss.

On the other hand, in the present embodiments, the water-based ink can also be used favorably with substrates having a 60° gloss of at least 25 but less than 40, and is preferably used with substrates having a 60° gloss of at least 27 but not more than 38. Substrates having a 60° gloss of at least 25 but less than 40 exhibit non-uniform wet spreading of water-based inks due to the fine unevenness that exists on the substrate surface, and there is a possibility that this unevenness may cause a deterioration in the drying properties and the printed image quality. However, as described above, the water-based inkjet ink of the present embodiments exhibits excellent drying properties and excellent printed image quality for the printed matter, and can therefore also be used favorably with substrates having a 60° gloss within the above range.

The 60° gloss described above refers to the specular gloss measured with an incident angle for the light beam of 60°, and is represented by a relative value in which the gloss of a standard plate (a glass plate having a refractive index of 1.567) is deemed to be 100%. The 60° gloss can be measured, for example, using a Micro Tri-Gloss (manufactured by BYK-Gardner GmbH).

Examples of printing substrates having a 60° gloss that satisfies one of the above ranges include coated paper substrates such as coated papers, art papers and cast papers, and plastic substrates such as polyvinyl chloride sheets, PET films and PP films.

(Coating Treatment)

The printed matter obtained by printing the water-based inkjet ink of an embodiment of the present invention onto a plastic substrate may, if required, be subjected to a coating treatment of the printed surface. Specific examples of the coating treatment include the coating or printing of a coating composition; and lamination methods such as dry lamination methods, solventless lamination methods, extrusion lamination methods and hot melt lamination. Any one of these methods may be selected, or a combination of both types of coating treatment may be used.

EXAMPLES

The present invention is described below in further detail using a series of examples and comparative examples. In the following description, unless particularly stated otherwise, "parts", "%" and "ratios" all represent weight-referenced values.

(Preparation of Varnish of Dispersing Resin X-1)

Reaction container fitted with a gas inlet, a thermometer, a condenser and a stirrer was charged with 20 parts of a styrene-acrylic resin X-1 (weight average molecular weight: 18,000, acid value: 110 mgKOH/g) manufactured by Seiko PMC Corporation, 3.76 parts of dimethylaminoethanol and 76.24 parts of water, thereby neutralizing 100% of the acrylic acid and generating an aqueous solution. Subsequently, 1 g of the obtained solution was sampled, the sample was heated and dried at 180° C. for 20 minutes, and the non-volatile fraction was measured. Water was then added to adjust the non-volatile fraction of the water-soluble resin varnish to 20%. This yielded a varnish of a dispersing resin X-1 with a non-volatile fraction of 20%.

(Cyan Pigment Aqueous Resin Dispersion 1)

Twenty parts of LIONOGEN BLUE FG-7358G (C. I. Pigment Blue 15:3, manufactured by Toyo Color Co., Ltd.) as a pigment, 15 parts of DISPERBYK-190 (weight average molecular weight: 2,400, acid value: 10 mgKOH/g) as a dispersant, and 65 parts of water were added to a container fitted with a disper mixer. Following preliminary dispersion of the mixture, a main dispersion treatment was conducted for two hours using a Dyno-Mill with a capacity of 0.6 L filled with 1,800 g of zirconia beads of diameter 0.5 mm, thus obtaining a cyan pigment aqueous resin dispersion 1 (pigment concentration: 20%). In this process, the amount of the non-volatile fraction (solid fraction) of the pigment dispersing resin relative to the blend amount of the pigment was 30% by weight.

(Cyan Pigment Aqueous Resin Dispersion 2)

Twenty parts of LIONOGEN BLUE FG-7358G (C. I. Pigment Blue 15:3, manufactured by Toyo Color Co., Ltd.) as a pigment, 30 parts of the varnish of the dispersing resin X-1 as a dispersant, and 50 parts of water were added to a container fitted with a disper mixer. Following preliminary dispersion of the mixture, a main dispersion treatment was conducted for two hours using a Dyno-Mill with a capacity of 0.6 L filled with 1,800 g of zirconia beads of diameter 0.5 mm, thus obtaining a cyan pigment aqueous resin dispersion 2 (pigment concentration: 20%). In this process, the amount of the non-volatile fraction (solid fraction) of the pigment dispersing resin relative to the blend amount of the pigment was 30% by weight.

In addition, in the following examples, CAB-O-JET 250 C (pigment concentration: 10%) which is a self-dispersing copper phthalocyanine pigment dispersion manufactured by Cabot Corporation, CAB-O-JET 265M (pigment concentration: 10%) which is a self-dispersing magenta pigment dispersion manufactured by Cabot Corporation, and CAB-O-JET 270Y (pigment concentration: 10%) which is a self-dispersing yellow pigment dispersion manufactured by Cabot Corporation were used as a cyan pigment dispersion 3, a magenta pigment dispersion 2 and a yellow pigment dispersion 2 respectively. Further, CAB-O-JET 200 (pigment concentration: 20%), which is a self-dispersing carbon black dispersion manufactured by Cabot Corporation, was diluted with an equal volume of water and used as a black pigment dispersion 2 (pigment concentration: 10%).

(Production Example for Binder Resin A (Random Structure))

A reaction container fitted with a gas inlet, a thermometer, a condenser and a stirrer was charged with 93.4 parts of butanol, and the container was then flushed with nitrogen gas. The inside of the reaction container was then heated to 110° C., and a mixture containing 7.5 parts of methacrylic acid, 67.5 parts of methyl methacrylate and 25 parts of butyl methacrylate as polymerizable monomers and 9 parts of V-601 (manufactured by Wako Pure Chemical Industries, Ltd.) as a polymerization initiator was added dropwise to the container over two hours to perform a polymerization reaction. Following completion of the dropwise addition, reaction was continued at 110° C. for a further three hours, an additional 0.9 parts of V-601 (manufactured by Wako Pure Chemical Industries, Ltd.) was added, and the reaction was continued at 110° C. for a further one hour, thus obtaining a binder resin A. The weight average molecular weight of the binder resin A measured using an HLC-8120GPC apparatus manufactured by Tosoh Corporation was about 10,000, and the molecular weight distribution width was 2.3.

The above binder resin A was then cooled to room temperature, and following the addition of 9.2 parts of dimethylaminoethanol to perform a neutralization, 100 parts of water was added. Subsequently, the obtained solution was heated to at least 100° C., the butanol was removed by azeotropic distillation with water, and the solid fraction of the obtained solution was adjusted to 30%, thus obtaining an aqueous solution of the bind resin A (solid fraction: 30%). The acid value calculated from the composition of monomers that formed the binder resin A was 48.9 mgKOH/g, and the glass transition temperature calculated using the above formula (2) was 81.0° C.

In this description, the term "aqueous solution" refers to a solution containing an aqueous medium (a medium containing water), and a component dispersed and/or dissolved in that aqueous medium.

(Production Examples for Binder Resins B to G and W to Y (Random Structures))

With the exceptions of altering the polymerizable monomers and the amount of dimethylaminoethanol added to achieve neutralization to the formulations shown in Table 1, aqueous solutions (solid fraction: 30%) of binder resins B to G and W to Y were obtained in the same manner as the production of the binder resin A. The values shown in Table 1 for the weight average molecular weight and the acid value were calculated using the same methods as those described for the binder resin A.

(Production Example for Binder Resin H (Block Structure))

A reaction container fitted with a gas inlet, a thermometer, a condenser and a stirrer was charged with 20 parts of toluene, 7.5 parts of methacrylic acid and 7.5 parts of methyl methacrylate as polymerizable monomers, 0.9 parts of 2,2'-azobisisobutyronitrile as a polymerization initiator, and 3.6 parts of 2-(dodecylthiocarbonothioylthio)-isobutyric acid. The inside of the reaction container was flushed with nitrogen gas, and the temperature was then raised to 75° C. and a polymerization reaction was conducted over a period of three hours, thus obtaining a copolymer (A block) formed from methacrylic acid and methyl methacrylate.

The mixed liquid in the reaction container prior to the nitrogen gas flushing, and the mixed liquid following the polymerization reaction were analyzed using a gas chromatography-mass spectrometer, and the detection peaks attributable to the methacrylic acid and methyl methacrylate used as raw materials were compared. The results revealed that in the mixed liquid following the polymerization reaction, almost no peaks attributable to the methacrylic acid and methyl methacrylate were observed. It is thought that these results indicate that almost all of the added polymerizable monomers had polymerized. Further, the weight average molecular weight of the above A block measured using an HLC-8120GPC apparatus manufactured by Tosoh Corporation was about 1,500, and the molecular weight distribution width was 1.4. Moreover, the acid value calculated from the composition of monomers that formed the A block was 325.9 mgKOH/g, and the glass transition temperature calculated using the above formula (2) was 117.1° C.

Following completion of the above polymerization reaction, the reaction system was cooled to normal temperature, and 60 parts of toluene, and 60 parts of methyl methacrylate and 25 parts of butyl methacrylate as polymerizable monomers were added to the reaction container. The inside of the reaction container was flushed with nitrogen gas, and the temperature was then raised to 75° C. and a polymerization reaction was conducted over a period of three hours, thus obtaining a binder resin H having an A-B block structure in which a copolymer (B block) formed from methyl methacrylate and butyl methacrylate had been added to the above A block.

In a similar manner to that described above for the A block, a comparison of the detection peaks attributable to the polymerizable monomers was conducted using a gas chromatography-mass spectrometer. The results confirmed that almost all of the added methyl methacrylate and butyl methacrylate had polymerized, which is thought to indicate formation of the hydrophobic block. Further, the acid value calculated from the composition of monomers that form the B block was 0 mgKOH/g, and the glass transition temperature calculated using the above formula (2) was 75.3° C.

Subsequently, the reaction system was cooled to normal temperature, a neutralization was performed by adding 9.3 parts of dimethylaminoethanol to the reaction container, and 200 parts of water was then added. The thus obtained solution was then heated, and following removal of the toluene by azeotropic distillation of toluene and water, the solid fraction of the obtained solution was adjusted to 30%, thus obtaining an aqueous mixed liquid of a binder resin H (solid fraction: 30%). The weight average molecular weight of the binder resin H measured using an HLC-8120GPC apparatus manufactured by Tosoh Corporation was about 9,800, and the molecular weight distribution width was 1.6. Further, the acid value calculated from the composition of monomers that formed the resin was 48.9 mgKOH/g, and the glass transition temperature calculated using the above formula (2) was 81.0° C.

(Production Examples for Binder Resins I to V (Block Structures))

With the exceptions of altering the types and amounts of the polymerizable monomers and the amount of the dimethylaminoethanol added to achieve neutralization to the conditions shown in Table 2, aqueous mixed liquids (solid fraction: 30%) of binder resins I to V were obtained in the same manner as the above binder resin H. Further, the results of analysis using a gas chromatography-mass spectrometer confirmed that, in each resin, almost all of the added polymerizable monomers had polymerized.

Furthermore, 20 parts of water was added to 10 parts of each of the aqueous solutions of the above binder resins A to Y to prepare an aqueous solutions having a solid fraction concentration of 10% in each case. When the loading index value of each of these aqueous solutions was measured using a UPA-EX150 apparatus manufactured by MicrotracBEL Corporation, the result was 10 or less in each case. These results confirmed that the binder resins A to Y functioned as water-soluble resins in the embodiments of the present invention.

TABLE 1

| | | Binder Resins | | | | | | | | | |
|---|---|---|---|---|---|---|---|---|---|---|---|
| | | A | B | C | D | E | F | G | W | X | Y |
| Polymerizable | AA | | | | | | | 7.5 | | | |
| monomers | MAA | 7.5 | 2.0 | 6.0 | 8.5 | 7.5 | 7.5 | | 0.5 | 11.5 | 12.5 |
| (parts) | MMA | 67.5 | 65.0 | 69.0 | 68.5 | 92.5 | 57.5 | 67.5 | 75.0 | 66.5 | 65.5 |
| | BMA | 25.0 | 25.0 | 25.0 | 23.0 | | 35.0 | 25.0 | 25.0 | 22.0 | 22.0 |
| Amount of dimethylaminoethanol (parts) | | 9.2 | 2.7 | 7.5 | 10.6 | 9.3 | 9.3 | 11.1 | 0.6 | 14.3 | 15.5 |
| Parameters | Weight average molecular weight Mw | 10,000 | 9,200 | 9,800 | 10,500 | 9,600 | 9,800 | 9,700 | 11,000 | 9,800 | 10,000 |
| | Acid value | 48.9 | 14.2 | 39.1 | 55.4 | 48.9 | 48.9 | 58.4 | 3.2 | 75.0 | 81.5 |
| | Tg | 81.0 | 77.8 | 80.7 | 83.1 | 106.8 | 71.6 | 79.5 | 79.4 | 84.7 | 84.9 |

TABLE 2

| | | | | Binder Resins | | | | | | |
|---|---|---|---|---|---|---|---|---|---|---|
| | | | | H | I | J | K | L | M | N | O |
| Polymerizable | A | | MAA | 7.5 | 7.5 | 7.5 | 7.5 | 7.5 | 7.5 | 7.5 | 7.5 |
| monomers | block | | MMA | 7.5 | 3.0 | 3.0 | 7.5 | 7.5 | 7.5 | 7.5 | 7.5 |
| | | | BMA | | | 4.5 | | | | | |
| | | | St | | | | 4.5 | | | | |
| | B | | St | | | | | | | | |

TABLE 2-continued

| | | | | | | | | | | |
|---|---|---|---|---|---|---|---|---|---|---|
| | block | MMA | 60.0 | 60.0 | 60.0 | 60.0 | 60.0 | 60.0 | 60.0 | 60.0 |
| | | BMA | 25.0 | 25.0 | 25.0 | | | | | |
| | | 2EHMA | | | | 25.0 | | | | |
| | | LA | | | | | 25.0 | 12.5 | | |
| | | STMA | | | | | | 12.5 | 25.0 | |
| | | VMA | | | | | | | | 25.0 |
| Amount of dimethylaminoethanol (parts) | | | 9.3 | 9.4 | 9.4 | 9.4 | 9.4 | 9.4 | 9.4 | 9.4 |
| Parameters | Weight average molecular weight Mw | | 9,800 | 15,500 | 11,000 | 13,000 | 14,000 | 15,100 | 16,500 | 17,000 |
| | Acid value | | 48.9 | 48.9 | 48.9 | 48.9 | 48.9 | 48.9 | 48.9 | 48.9 |
| | Tg | | 81.0 | 76.7 | 79.9 | 69.2 | 72.1 | 79.5 | 87.3 | 92.8 |

| | | | Binder Resins | | | | | | |
|---|---|---|---|---|---|---|---|---|---|
| | | | P | Q | R | S | T | U | V |
| Polymerizable monomers | A block | MAA | 7.5 | 7.5 | 7.5 | 5.0 | 2.5 | 10.0 | 11.0 |
| | | MMA | 7.5 | 7.5 | 7.5 | 5.0 | 2.5 | 10.0 | 11.0 |
| | | BMA | | | | | | | |
| | | St | | | | | | | |
| | B block | St | 25.0 | 10.0 | 10.0 | 10.0 | 5.0 | 20.0 | 22.0 |
| | | MMA | 60.0 | 60.0 | 60.0 | 65.0 | 32.5 | 130.0 | 143.0 |
| | | BMA | | | | | | | |
| | | 2EHMA | | | | | | | |
| | | LA | | 15.0 | | | | | |
| | | STMA | | | 15.0 | 15.0 | 7.5 | 30.0 | 33.0 |
| | | VMA | | | | | | | |
| Amount of dimethylaminoethanol (parts) | | | 9.4 | 9.4 | 9.4 | 6.2 | 3.1 | 12.4 | 13.6 |
| Parameters | Weight average molecular weight Mw | | 9,800 | 12,500 | 14,000 | 13,000 | 5,000 | 20,000 | 22,000 |
| | Acid value | | 48.9 | 48.9 | 48.9 | 32.6 | 32.6 | 32.6 | 32.6 |
| | Tg | | 100.1 | 82.8 | 92.3 | 91.8 | 91.8 | 91.8 | 91.8 |

The abbreviations used above in Tables 1 and 2 have the following meanings.
AA: acrylic acid
MAA: methacrylic acid
MMA: methyl methacrylate
BMA: butyl methacrylate
2EHMA: 2-ethylhexyl methacrylate
LA: lauryl acrylate
STMA: stearyl methacrylate
VMA: behenyl methacrylate
St: styrene (Preparation of Varnish of Water-Soluble Resin J819)

A reaction container fitted with a gas inlet, a thermometer, a condenser and a disper mixer was charged with 20 parts of JONCRYL 819 (weight average molecular weight: 14,500, acid value: 75 mgKOH/g), 2.38 parts of dimethylaminoethanol and 77.62 parts of water, and the mixture was stirred thoroughly, thereby neutralizing the acrylic acid and generating an aqueous solution. Subsequently, 1 g of the obtained solution was sampled, the sample was heated and dried at 180° C. for 20 minutes, and the non-volatile fraction was measured. Water was then added to adjust the non-volatile fraction of the water-soluble resin varnish to 20%. This yielded a varnish of the water-soluble resin J819 with a non-volatile fraction of 20%.

(Production Example for Evaluation Ink 1)

A container fitted with a disper mixer was charged with 20.0 parts of the cyan pigment dispersion 3, 20.0 parts of the aqueous solution (solid fraction: 30%) of the binder resin A (solid fraction equivalent: 6.0 parts) and 15.0 parts of 1,2-propanediol, and water was then added to bring the total up to 100 parts. The resulting mixture was stirred thoroughly until uniform using the disper mixer, and the thus obtained mixture was then filtered through a membrane filter having a pore size of 1 μm to remove the coarse particles that can cause head blockages, thus obtaining an evaluation ink 1.

(Production Examples for Evaluation Inks 2 to 69)

With the exception of altering the types and amounts of the materials to the conditions shown in Tables 3 to 5, evaluation inks 2 to 69 were produced in the same manner as the evaluation ink 1.

TABLE 3

| | | Examples | | | | | |
|---|---|---|---|---|---|---|---|
| | | 1 | 2 | 3 | 4 | 5 | 6 |
| | Evaluation Ink | 1 | 2 | 3 | 4 | 5 | 6 |
| Pigment dispersion | Cyan pigment dispersion 3 | 20.0% | | | | 20.0% | 20.0% |
| | Magenta pigment dispersion 2 | | 20.0% | | | | |
| | Yellow pigment dispersion 2 | | | 20.0% | | | |
| | Black pigment dispersion 2 | | | | 20.0% | | |
| Binder resin aqueous solution (solid fraction: 30%) | Binder resin A | 20.0% | 20.0% | 20.0% | 20.0% | 20.0% | 20.0% |

TABLE 3-continued

|  |  |  | Surface tension (mN/m) | Boiling point (° C.) |  |  |  |  |  |  |
|---|---|---|---|---|---|---|---|---|---|---|
| Water-soluble organic solvents | Specified water-soluble organic solvents | 1,2-propanediol | 35 | 188 | 15.0% | 15.0% | 15.0% | 15.0% |  |  |
|  |  | 1,3-propanediol | 47 | 214 |  |  |  |  | 15.0% |  |
|  |  | diethylene glycol monomethyl ether | 34 | 193 |  |  |  |  |  | 15.0% |
|  |  | diethylene glycol monoethyl ether | 31 | 196 |  |  |  |  |  |  |
|  |  | dipropylene glycol | 33 | 230 |  |  |  |  |  |  |
|  |  | diethylene glycol monoethyl ether acetate | 30 | 218 |  |  |  |  |  |  |
|  |  | N-methylpyrrolidone | 40 | 202 |  |  |  |  |  |  |
|  |  | γ-butyrolactone | 43 | 204 |  |  |  |  |  |  |
|  |  | 1,2-butanediol | 32 | 191 |  |  |  |  |  |  |
|  |  | 1,3-butanediol | 37 | 207 |  |  |  |  |  |  |
|  |  | 1,4-butanediol | 43 | 228 |  |  |  |  |  |  |
|  |  | 2-methyl-1,3-propanediol | 38 | 214 |  |  |  |  |  |  |
|  | Other water-soluble organic solvents | ethylene glycol monomethyl ether | 30 | 124 |  |  |  |  |  |  |
|  |  | 1,2-hexanediol | 26 | 224 |  |  |  |  |  |  |
|  |  | glycerol | 62 | 290 |  |  |  |  |  |  |
|  |  | Water |  |  | 45.0% | 45.0% | 45.0% | 45.0% | 45.0% | 45.0% |

|  |  | Examples |  |  |  |  |
|---|---|---|---|---|---|---|
|  |  | 7 | 8 | 9 | 10 | 11 |
|  | Evaluation Ink | 7 | 8 | 9 | 10 | 11 |
| Pigment dispersion | Cyan pigment dispersion 3 | 20.0% | 20.0% | 20.0% | 20.0% | 20.0% |
|  | Magenta pigment dispersion 2 |  |  |  |  |  |
|  | Yellow pigment dispersion 2 |  |  |  |  |  |
|  | Black pigment dispersion 2 |  |  |  |  |  |
| Binder resin aqueous solution (solid fraction: 30%) | Binder resin A | 20.0% | 20.0% | 20.0% | 20.0% | 20.0% |

|  |  |  | Surface tension (mN/m) | Boiling point (° C.) |  |  |  |  |  |
|---|---|---|---|---|---|---|---|---|---|
| Water-soluble organic solvents | Specified water-soluble organic solvents | 1,2-propanediol | 35 | 188 |  |  |  |  |  |
|  |  | 1,3-propanediol | 47 | 214 |  |  |  |  |  |
|  |  | diethylene glycol monomethyl ether | 34 | 193 |  |  |  |  |  |
|  |  | diethylene glycol monoethyl ether | 31 | 196 | 15.0% |  |  |  |  |
|  |  | dipropylene glycol | 33 | 230 |  | 15.0% |  |  |  |
|  |  | diethylene glycol monoethyl ether acetate | 30 | 218 |  |  | 15.0% |  |  |
|  |  | N-methylpyrrolidone | 40 | 202 |  |  |  | 15.0% |  |
|  |  | γ-butyrolactone | 43 | 204 |  |  |  |  | 15.0% |
|  |  | 1,2-butanediol | 32 | 191 |  |  |  |  |  |
|  |  | 1,3-butanediol | 37 | 207 |  |  |  |  |  |
|  |  | 1,4-butanediol | 43 | 228 |  |  |  |  |  |
|  |  | 2-methyl-1,3-propanediol | 38 | 214 |  |  |  |  |  |
|  | Other water-soluble organic solvents | ethylene glycol monomethyl ether | 30 | 124 |  |  |  |  |  |
|  |  | 1,2-hexanediol | 26 | 224 |  |  |  |  |  |
|  |  | glycerol | 62 | 290 |  |  |  |  |  |
|  |  | Water |  |  | 45.0% | 45.0% | 45.0% | 45.0% | 45.0% |

|  |  | Examples |  |  |  |  |  |
|---|---|---|---|---|---|---|---|
|  |  | 12 | 13 | 14 | 15 | 16 | 17 |
|  | Evaluation Ink | 12 | 13 | 14 | 15 | 16 | 17 |
| Pigment dispersion | Cyan pigment dispersion 3 | 20.0% | 20.0% | 20.0% | 20.0% | 20.0% | 20.0% |
|  | Magenta pigment dispersion 2 |  |  |  |  |  |  |
|  | Yellow pigment dispersion 2 |  |  |  |  |  |  |
|  | Black pigment dispersion 2 |  |  |  |  |  |  |
| Binder resin aqueous solution (solid fraction: 30%) | Binder resin A | 20.0% | 20.0% | 20.0% | 20.0% | 20.0% | 20.0% |

TABLE 3-continued

|  |  |  | Surface tension (mN/m) | Boiling point (° C.) |  |  |  |  |  |  |
|---|---|---|---|---|---|---|---|---|---|---|
| Water-soluble organic solvents | Specified water-soluble organic solvents | 1,2-propanediol | 35 | 188 |  |  |  |  |  |  |
|  |  | 1,3-propanediol | 47 | 214 |  |  |  |  |  |  |
|  |  | diethylene glycol monomethyl ether | 34 | 193 |  |  |  |  |  |  |
|  |  | diethylene glycol monoethyl ether | 31 | 196 |  |  |  |  |  |  |
|  |  | dipropylene glycol | 33 | 230 |  |  |  |  |  |  |
|  |  | diethylene glycol monoethyl ether acetate | 30 | 218 |  |  |  |  |  |  |
|  |  | N-methylpyrrolidone | 40 | 202 |  |  |  |  |  |  |
|  |  | γ-butyrolactone | 43 | 204 |  |  |  |  |  |  |
|  |  | 1,2-butanediol | 32 | 191 | 15.0% |  |  |  | 25.0% | 50.0% |
|  |  | 1,3-butanediol | 37 | 207 |  | 15.0% |  |  |  |  |
|  |  | 1,4-butanediol | 43 | 228 |  |  | 15.0% |  |  |  |
|  |  | 2-methyl-1,3-propanediol | 38 | 214 |  |  |  | 15.0% |  |  |
|  | Other water-soluble organic solvents | ethylene glycol monomethyl ether | 30 | 124 |  |  |  |  |  |  |
|  |  | 1,2-hexanediol | 26 | 224 |  |  |  |  |  |  |
|  |  | glycerol | 62 | 290 |  |  |  |  |  |  |
|  |  | Water |  |  | 45.0% | 45.0% | 45.0% | 45.0% | 35.0% | 10.0% |

|  |  | Examples |  |  |  |  |  |
|---|---|---|---|---|---|---|---|
|  |  | 18 | 19 | 20 | 21 | 22 | 23 |
|  | Evaluation Ink | 18 | 19 | 20 | 21 | 22 | 23 |
| Pigment dispersion | Cyan pigment dispersion 3 | 20.0% | 20.0% | 20.0% | 20.0% | 20.0% | 20.0% |
|  | Magenta pigment dispersion 2 |  |  |  |  |  |  |
|  | Yellow pigment dispersion 2 |  |  |  |  |  |  |
|  | Black pigment dispersion 2 |  |  |  |  |  |  |
| Binder resin aqueous solution (solid fraction: 30%) | Binder resin A | 20.0% | 20.0% | 20.0% | 20.0% | 20.0% | 20.0% |

|  |  |  | Surface tension (mN/m) | Boiling point (° C.) |  |  |  |  |  |  |
|---|---|---|---|---|---|---|---|---|---|---|
| Water-soluble organic solvents | Specified water-soluble organic solvents | 1,2-propanediol | 35 | 188 |  |  |  |  |  |  |
|  |  | 1,3-propanediol | 47 | 214 |  |  |  |  |  |  |
|  |  | diethylene glycol monomethyl ether | 34 | 193 |  |  |  |  |  |  |
|  |  | diethylene glycol monoethyl ether | 31 | 196 |  |  |  |  |  |  |
|  |  | dipropylene glycol | 33 | 230 |  |  |  | 12.0% | 2.0% | 22.0% |
|  |  | diethylene glycol monoethyl ether acetate | 30 | 218 |  |  |  |  |  |  |
|  |  | N-methylpyrrolidone | 40 | 202 |  |  |  |  |  |  |
|  |  | γ-butyrolactone | 43 | 204 |  |  |  |  |  |  |
|  |  | 1,2-butanediol | 32 | 191 | 15.0% | 15.0% | 3.0% | 23.0% | 3.0% | 23.0% |
|  |  | 1,3-butanediol | 37 | 207 |  |  |  |  |  |  |
|  |  | 1,4-butanediol | 43 | 228 |  |  |  |  |  |  |
|  |  | 2-methyl-1,3-propanediol | 38 | 214 |  |  |  |  |  |  |
|  | Other water-soluble organic solvents | ethylene glycol monomethyl ether | 30 | 124 |  |  |  |  |  | 5.0% |
|  |  | 1,2-hexanediol | 26 | 224 | 10.0% |  | 10.0% |  |  |  |
|  |  | glycerol | 62 | 290 |  | 10.0% |  |  |  |  |
|  |  | Water |  |  | 35.0% | 35.0% | 35.0% | 35.0% | 35.0% | 32.0% |

TABLE 4

|  |  | Examples |  |  |  |  |  |  |  |  |
|---|---|---|---|---|---|---|---|---|---|---|
|  |  | 24 | 25 | 26 | 27 | 28 | 29 | 30 | 31 | 32 |
|  | Evaluation ink | 24 | 25 | 26 | 27 | 28 | 29 | 30 | 31 | 32 |
| Pigment dispersion | Cyan pigment dispersion 1 |  |  |  |  |  |  |  |  |  |
|  | Cyan pigment dispersion 2 |  |  |  |  |  |  |  |  |  |
|  | Cyan pigment dispersion 3 | 20.0% | 20.0% | 20.0% | 20.0% | 20.0% | 20.0% | 20.0% | 20.0% | 20.0% |

TABLE 4-continued

| | | | | | | | | | | |
|---|---|---|---|---|---|---|---|---|---|---|
| Binder resin aqueous solution (solid fraction: 30%) | Binder resin B | | | | | | 20.0% | | | |
| | Binder resin C | | | 20.0% | | 20.0% | | | | |
| | Binder resin D | | | | | | | 20.0% | | |
| | Binder resin E | | | | | | | | 20.0% | |
| | Binder resin F | | | | | | | | | 20.0% |
| | Binder resin G | | | | | | | | | |
| | Binder resin H | | | | | | | | | |
| | Binder resin I | | | | | | | | | |
| | Binder resin J | | | | | | | | | |
| | Binder resin K | | | | | | | | | |
| | Binder resin L | | | | | | | | | |
| | Binder resin M | | | | | | | | | |
| | Binder resin N | | | | | | | | | |
| | Binder resin O | | | | | | | | | |
| | Binder resin P | | | | | | | | | |
| | Binder resin Q | | | | | | | | | |
| | Binder resin R | | | | | | | | | |
| | Binder resin S | | | | | | | | | |
| | Binder resin T | | | | | | | | | |
| | Binder resin U | | | | | | | | | |
| | Binder resin V | | | | | | | | | |

| | | | Surface tension (mN/m) | Boiling point (° C.) | | | | | | | | |
|---|---|---|---|---|---|---|---|---|---|---|---|---|
| Water-soluble organic solvents | Specified water-soluble organic solvents | 1,3-propanediol | 47 | 214 | | | | | | | | |
| | | 1,2-butanediol | 32 | 191 | 23.0% | 23.0% | 23.0% | 23.0% | 23.0% | 23.0% | 23.0% | 23.0% |
| | Other water-soluble organic solvents | ethylene glycol monomethyl ether | 30 | 124 | 5.0% | 5.0% | 5.0% | 5.0% | 5.0% | 5.0% | 5.0% | 5.0% |
| | Surfactants | Surfynol 465 | | | | | | | | | | |
| | | Surfynol 104 | | | | | | | | | | |
| | | Water | | | 32.0% | 32.0% | 32.0% | 32.0% | 32.0% | 32.0% | 32.0% | 32.0% |

| | | Examples | | | | | | |
|---|---|---|---|---|---|---|---|---|
| | | 33 | 34 | 35 | 36 | 37 | 38 | 39 |
| | Evaluation ink | 33 | 34 | 35 | 36 | 37 | 38 | 39 |
| Pigment dispersion | Cyan pigment dispersion 1 | | | | | | | |
| | Cyan pigment dispersion 2 | | | | | | | |
| | Cyan pigment dispersion 3 | 20.0% | 20.0% | 20.0% | 20.0% | 20.0% | 20.0% | 20.0% |
| Binder resin aqueous solution (solid fraction: 30%) | Binder resin B | | | | | | | |
| | Binder resin C | | | | | | | |
| | Binder resin D | | | | | | | |
| | Binder resin E | | | | | | | |
| | Binder resin F | | | | | | | |
| | Binder resin G | | | | | | | |
| | Binder resin H | | | | | | | |
| | Binder resin I | | | | | | | |
| | Binder resin J | | | | | | | |
| | Binder resin K | 20.0% | | | | | | |
| | Binder resin L | | 20.0% | | | | | |
| | Binder resin M | | | 20.0% | | | | |
| | Binder resin N | | | | 20.0% | | | |
| | Binder resin O | | | | | 20.0% | | |
| | Binder resin P | | | | | | 20.0% | |
| | Binder resin Q | | | | | | | 20.0% |
| | Binder resin R | | | | | | | |
| | Binder resin S | | | | | | | |
| | Binder resin T | | | | | | | |
| | Binder resin U | | | | | | | |
| | Binder resin V | | | | | | | |

| | | | Surface tension (mN/m) | Boiling point (° C.) | | | | | | | |
|---|---|---|---|---|---|---|---|---|---|---|---|
| Water-soluble organic solvents | Specified water-soluble organic solvents | 1,3-propanediol | 47 | 214 | | | | | | | |
| | | 1,2-butanediol | 32 | 191 | 23.0% | 23.0% | 23.0% | 23.0% | 23.0% | 23.0% | 23.0% |
| | Other water-soluble organic solvents | ethylene glycol monomethyl ether | 30 | 124 | 5.0% | 5.0% | 5.0% | 5.0% | 5.0% | 5.0% | 5.0% |

TABLE 4-continued

| | | | | | | | | | | | |
|---|---|---|---|---|---|---|---|---|---|---|---|
| | Surfactants | Surfynol 465 | | | | | | | | | |
| | | Surfynol 104 | | | | | | | | | |
| | | Water | | 32.0% | 32.0% | 32.0% | 32.0% | 32.0% | 32.0% | 32.0% | |

| | | | Examples | | | | | | | |
|---|---|---|---|---|---|---|---|---|---|---|
| | | | 40 | 41 | 42 | 43 | 44 | 45 | 46 | 47 |
| | | Evaluation ink | 40 | 41 | 42 | 43 | 44 | 45 | 46 | 47 |
| Pigment dispersion | | Cyan pigment dispersion 1 | | | | | | | | |
| | | Cyan pigment dispersion 2 | | | | | | | | |
| | | Cyan pigment dispersion 3 | 20.0% | 20.0% | 20.0% | 20.0% | 20.0% | 20.0% | 20.0% | 20.0% |
| Binder resin aqueous solution (solid fraction: 30%) | | Binder resin B | | | | | | | | |
| | | Binder resin C | | | | | | | | |
| | | Binder resin D | | | | | | | | |
| | | Binder resin E | | | | | | | | |
| | | Binder resin F | | | | | | | | |
| | | Binder resin G | | | | | | | | |
| | | Binder resin H | | | | | | | | |
| | | Binder resin I | | | | | | | | |
| | | Binder resin J | | | | | | | | |
| | | Binder resin K | | | | | | | | |
| | | Binder resin L | | | | | | | | |
| | | Binder resin M | | | | | | | | |
| | | Binder resin N | | | | | | | | |
| | | Binder resin O | | | | | | | | |
| | | Binder resin P | | | | | | | | |
| | | Binder resin Q | | | | | | | | |
| | | Binder resin R | 20.0% | | | | | | | |
| | | Binder resin S | | 20.0% | | | | | | |
| | | Binder resin T | | | 20.0% | | | | | |
| | | Binder resin U | | | | 20.0% | 3.3% | 6.7% | 33.3% | 40.0% |
| | | Binder resin V | | | | | | | | |

| | | | Surface tension (mN/m) | Boiling point (° C.) | | | | | | | |
|---|---|---|---|---|---|---|---|---|---|---|---|
| Water-soluble organic solvents | Specified water-soluble organic solvents | 1,3-propanediol | 47 | 214 | | | | | | | |
| | | 1,2-butanediol | 32 | 191 | 23.0% | 23.0% | 23.0% | 23.0% | 23.0% | 23.0% | 23.0% | 23.0% |
| | Other water-soluble organic solvents | ethylene glycol monomethyl ether | 30 | 124 | 5.0% | 5.0% | 5.0% | 5.0% | 5.0% | 5.0% | 5.0% | 5.0% |
| | Surfactants | Surfynol 465 | | | | | | | | | | |
| | | Surfynol 104 | | | | | | | | | | |
| | | Water | | | 32.0% | 32.0% | 32.0% | 32.0% | 48.7% | 45.3% | 18.7% | 12.0% |

| | | | Examples | | | | | | |
|---|---|---|---|---|---|---|---|---|---|
| | | | 48 | 49 | 50 | 51 | 52 | 53 | 54 |
| | | Evaluation ink | 48 | 49 | 50 | 51 | 52 | 53 | 54 |
| Pigment dispersion | | Cyan pigment dispersion 1 | | 10.0% | | | | | |
| | | Cyan pigment dispersion 2 | | | 10.0% | 10.0% | 10.0% | 10.0% | 10.0% |
| | | Cyan pigment dispersion 3 | 20.0% | | | | | | |
| Binder resin aqueous solution (solid fraction: 30%) | | Binder resin B | | | | | | | |
| | | Binder resin C | | | | | | | |
| | | Binder resin D | | | | | | | |
| | | Binder resin E | | | | | | | |
| | | Binder resin F | | | | | | | |
| | | Binder resin G | | | | | | | |
| | | Binder resin H | | | | | | | |
| | | Binder resin I | | | | | | | |
| | | Binder resin J | | | | | | | |
| | | Binder resin K | | | | | | | |
| | | Binder resin L | | | | | | | |
| | | Binder resin M | | | | | | | |
| | | Binder resin N | | | | | | | |
| | | Binder resin O | | | | | | | |
| | | Binder resin P | | | | | | | |
| | | Binder resin Q | | | | | | | |
| | | Binder resin R | | | | | | | |
| | | Binder resin S | | | | | | | |
| | | Binder resin T | | | | | | | |

TABLE 4-continued

|  |  |  | Surface tension (mN/m) | Boiling point (° C.) |  |  |  |  |  |  |  |
|---|---|---|---|---|---|---|---|---|---|---|---|
|  | Binder resin U |  |  |  |  | 20.0% | 20.0% | 20.0% | 20.0% | 3.0% | 3.0% |
|  | Binder resin V |  |  |  | 20.0% |  |  |  |  |  |  |
| Water-soluble organic solvents | Specified water-soluble organic solvents | 1,3-propanediol | 47 | 214 |  |  |  |  |  | 23.0% | 23.0% |
|  |  | 1,2-butanediol | 32 | 191 | 23.0% | 23.0% | 23.0% | 23.0% | 23.0% |  |  |
|  | Other water-soluble organic solvents | ethylene glycol monomethyl ether | 30 | 124 | 5.0% | 5.0% | 5.0% | 5.0% | 5.0% | 5.0% | 5.0% |
|  | Surfactants | Surfynol 465 |  |  |  |  |  | 1.0% |  |  | 1.0% |
|  |  | Surfynol 104 |  |  |  |  |  |  | 1.0% |  |  |
|  |  | Water |  |  | 32.0% | 52.0% | 52.0% | 51.0% | 51.0% | 69.0% | 68.0% |

TABLE 5

|  |  |  | Comparative Examples |  |  |  |  |  |  |  |
|---|---|---|---|---|---|---|---|---|---|---|
|  |  |  | 1 | 2 | 3 | 4 | 5 | 6 | 7 | 8 |
|  | Evaluation ink |  | 55 | 56 | 57 | 58 | 59 | 60 | 61 | 62 |
| Pigment dispersion | Cyan pigment dispersion 3 |  | 20.0% | 20.0% | 20.0% | 20.0% | 20.0% | 20.0% | 20.0% | 20.0% |
| Binder resin aqueous solution (solid fraction: 30%) | Binder resin A |  |  |  |  |  |  |  | 20.0% | 20.0% |
|  | Binder resin H |  |  |  |  |  |  |  |  |  |
|  | Binder resin S |  |  |  |  |  |  |  |  |  |
|  | Binder resin W |  | 20.0% | 20.0% |  |  |  |  |  |  |
|  | Binder resin X |  |  |  | 20.0% |  |  |  |  |  |
|  | Binder resin Y |  |  |  |  | 20.0% |  |  |  |  |
|  | J819 varnish |  |  |  |  |  | 20.0% |  |  |  |
| Water-dispersible resin microparticles | J734 |  |  |  |  |  |  | 14.3% |  |  |

|  |  |  | Surface tension (mN/m) | Boiling point (° C.) |  |  |  |  |  |  |  |  |
|---|---|---|---|---|---|---|---|---|---|---|---|---|
| Water-soluble organic solvents | Specified water-soluble organic solvents | 1,2-butanediol | 32 | 191 |  | 25.0% | 25.0% | 25.0% | 25.0% | 25.0% |  |  |
|  | Other water-soluble organic solvents | ethylene glycol monomethyl ether | 30 | 124 | 25.0% |  |  |  |  |  | 25.0% |  |
|  |  | 1,2-hexanediol | 26 | 224 |  |  |  |  |  |  |  | 25.0% |
|  |  | glycerol | 62 | 290 |  |  |  |  |  |  |  |  |
|  | Surfactant | Surfynol 104 |  |  |  |  |  |  |  |  |  |  |
|  |  | Water |  |  | 35.0% | 35.0% | 35.0% | 35.0% | 35.0% | 40.7% | 35.0% | 35.0% |

|  |  |  | Comparative Examples |  |  |  |  |  |  |
|---|---|---|---|---|---|---|---|---|---|
|  |  |  | 9 | 10 | 11 | 12 | 13 | 14 | 15 |
|  | Evaluation ink |  | 63 | 64 | 65 | 66 | 67 | 68 | 69 |
| Pigment dispersion | Cyan pigment dispersion 3 |  | 20.0% | 20.0% | 20.0% | 20.0% | 20.0% | 20.0% | 20.0% |
| Binder resin aqueous solution (solid fraction: 30%) | Binder resin A |  | 20.0% | 20.0% | 20.0% | 20.0% | 20.0% |  |  |
|  | Binder resin H |  |  |  |  |  |  | 20.0% |  |
|  | Binder resin S |  |  |  |  |  |  |  | 20.0% |
|  | Binder resin W |  |  |  |  |  |  |  |  |
|  | Binder resin X |  |  |  |  |  |  |  |  |
|  | Binder resin Y |  |  |  |  |  |  |  |  |
|  | J819 varnish |  |  |  |  |  |  |  |  |
| Water-dispersible resin microparticles | J734 |  |  |  |  |  |  |  |  |

|  |  |  | Surface tension (mN/m) | Boiling point (° C.) |  |  |  |  |  |  |  |
|---|---|---|---|---|---|---|---|---|---|---|---|
| Water-soluble organic solvents | Specified water-soluble organic solvents | 1,2-butanediol | 32 | 191 | 10.0% | 60.0% | 10.0% |  |  |  |  |
|  | Other water-soluble solvents | ethylene glycol monomethyl ether | 30 | 124 |  |  |  |  | 5.0% | 5.0% | 5.0% |

TABLE 5-continued

| | | | | | | | | | | |
|---|---|---|---|---|---|---|---|---|---|---|
| organic solvents | 1,2-hexanediol | 26 | 224 | | | | 15.0% | 20.0% | 20.0% | 20.0% |
| | glycerol | 62 | 290 | 25.0% | | | | | | |
| Surfactant | Surfynol 104 | | | | | | | | | 1.0% |
| | Water | | | 35.0% | 50.0% | 0.0% | 35.0% | 35.0% | 35.0% | 35.0% |

Of the abbreviations listed in Table 5, "J734" represents JONCRYL 734 (acrylic water-dispersible resin microparticles, manufactured by BASF Corporation, solid fraction: 42%, acid value: 87 mgKOH/g, Tg: 30° C.).

(Evaluation 1: Evaluation of Ink Decap Properties)

An inkjet printer "Oce Monostream 500" fitted with an IR lamp, manufactured by Canon Production Printing Systems Inc. was prepared, and each of the evaluation inks 1 to 54 (Examples 1 to 54) and 55 to 69 (Comparative Examples 1 to 15) was loaded into the printer. Following ink loading, a nozzle check pattern was printed (drop volume: 5 pL), and confirmation that the ink was being discharged correctly from all nozzles was conducted. Subsequently, the inkjet printer was placed in standby for a prescribed period, and a second nozzle check pattern was then printed. Using this nozzle check pattern, the decap properties were evaluated by confirming whether or not any nozzle misfires had occurred. The evaluation criteria were as follows, with evaluations of A to C being deemed practically usable levels.

A: even when printing was performed after standby of 3 hours, absolutely no nozzle misfires occurred B: when printing was performed after standby of 2 hours, absolutely no nozzle misfires occurred, but when printing was performed after standby of 3 hours, one or more nozzle misfires occurred C: when printing was performed after standby of 1 hour, absolutely no nozzle misfires occurred, but when printing was performed after standby of 2 hours, one or more nozzle misfires occurred D: even when printing was performed after standby of 1 hour, one or more nozzle misfires occurred (Evaluation 2: Evaluation of Discharge Stability during High-Speed Printing)

Using an inkjet printer Oce Monostream 500, manufactured by Canon Production Printing Systems Inc., image data which produced a non-printed portion of a prescribed length and subsequently printed a nozzle check pattern was used to perform single-pass printing onto a rolled matt coated paper (Mitsubishi DF Color M, grammage: 104.7 g/m$^2$). Printing was performed at a printing speed of 80 m/minute, and the discharge stability during high-speed printing was evaluated by visually confirming the presence or absence of nozzle misfires in the nozzle check pattern when the length of the non-printed portion was changed. The evaluation criteria were as follows, with evaluations of A to C being deemed practically usable levels.

A: even when length of non-printed portion was 1,000 m, no nozzle misfires occurred.

B: when length of non-printed portion was 500 m, no nozzle misfires occurred, but when length was 1,000 m, nozzle misfires occurred.

C: when length of non-printed portion was 100 m, no nozzle misfires occurred, but when length was 500 m, nozzle misfires occurred.

D: even when length of non-printed portion was 100 m, nozzle misfires occurred.

(Evaluation 3: Evaluation of Drying Properties)

Using an inkjet printer Oce Monostream 500, manufactured by Canon Production Printing Systems Inc., which is a fixed head printer, single-pass solid printing with a print ratio of 100% was performed onto a rolled matt coated paper (Mitsubishi DF Color M, grammage: 104.7 g/m$^2$) using various printing speeds. Using the printed matter that had been rolled immediately following printing, the drying properties were evaluated by visual confirmation of color transfer to non-printed portions and damage to the printed surface (blocking). The evaluation criteria were as follows, with evaluations of A to C being deemed practically usable levels.

A: no blocking occurred at a printing speed of 80 m/minute

B: no blocking occurred at a printing speed of 70 m/minute, but blocking occurred at 80 m/minute C: no blocking occurred at a printing speed of 60 m/minute, but blocking occurred at 70 m/minute D: blocking occurred even at a printing speed of 60 m/minute (Evaluation 4: Evaluation of Coverage of Solid Printed Matter with a Print Ratio of 100%)

Using the solid printed matter with a print ratio of 100% produced at various printing speeds in the Evaluation 3, the solid printed matter coverage was evaluated by inspecting the level of voids in the printed matter under a magnifying glass and with the naked eye. The evaluation criteria were as follows, with evaluations of A to C being deemed practically usable levels.

A: in the printed matter produced at a printing speed of 80 m/minute, no voids were visible under the magnifying glass or with the naked eye B: in the printed matter produced at a printing speed of 70 m/minute, no voids were visible under the magnifying glass or with the naked eye, but in the printed matter produced at 80 m/minute, voids were confirmed either under the magnifying glass or with the naked eye C: in the printed matter produced at a printing speed of 60 m/minute, no voids were visible under the magnifying glass or with the naked eye, but in the printed matter produced at 70 m/minute, voids were confirmed either under the magnifying glass or with the naked eye D: even in the printed matter produced at a printing speed of 60 m/minute, voids were confirmed either under the magnifying glass or with the naked eye (Evaluation 5: Evaluation of Water Resistance of Printed Matter)

Using the solid printed matter produced at a printing speed of 60 m/minute in the Evaluation 3, the solid portion of the printed matter was rubbed with a cotton swab that had been soaked in water, and the resulting state was inspected visually to evaluate the water resistance. The evaluation criteria were as follows, with evaluations of A to C being deemed practically usable levels.

A: even when rubbed 15 times with a cotton swab soaked in water, no peeling of the printed matter and no adhesion of the ink to the cotton swab occurred.

B: when rubbed 10 times with a cotton swab soaked in water, no peeling of the printed matter and no adhesion of the ink to the cotton swab occurred, but when rubbed 15 times, peeling of the printed matter or adhesion of the ink to the cotton swab was observed C: when rubbed 5 times with a cotton swab soaked in water, no peeling of the printed matter and no adhesion of the ink to the cotton swab occurred, but when rubbed 10 times, peeling of the printed matter or adhesion of the ink to the cotton swab was observed D: when rubbed 5 times with a cotton swab soaked in water, peeling of the printed matter or adhesion of the ink to the cotton swab was observed (Evaluation 6: Evaluation of Ink Viscosity Storage Stability)

Using an E-type viscometer (TVE-20L, manufactured by Toki Sangyo Co., Ltd.), a viscosity measurement was conducted for each ink under conditions including a temperature of 25° C. and a rotational rate of 50 rpm. Subsequently, the ink was stored in a thermostatic chamber at 70° C. to accelerate any change over time, and the viscosity of the ink was then remeasured to evaluate the change in ink viscosity over the storage period. The evaluation criteria were as follows, with evaluations of A to C being deemed practically usable levels.

A: the change in viscosity after storage for 6 weeks was less than ±5%

B: the change in viscosity after storage for 4 weeks was less than ±5%, and the change in viscosity after storage for 6 weeks was less than ±10%

C: the change in viscosity after storage for 4 weeks was less than ±10%, but the change in viscosity after storage for 6 weeks was at least ±10%

D: the change in viscosity after storage for 4 weeks was at least ±10%

TABLE 6

| Example No. | Evaluation 1 Decap | Evaluation 2 Discharge stability | Evaluation 3 Drying properties | Evaluation 4 Coverage | Evaluation 5 Water resistance | Evaluation 6 Stability |
|---|---|---|---|---|---|---|
| 1 | C | C | C | C | B | B |
| 2 | C | C | C | C | B | B |
| 3 | C | C | C | C | B | B |
| 4 | C | C | B | C | B | B |
| 5 | B | B | C | C | C | B |
| 6 | C | C | C | C | B | C |
| 7 | C | C | B | B | C | C |
| 8 | B | C | C | C | C | B |
| 9 | C | C | B | B | C | C |
| 10 | C | C | C | C | C | C |
| 11 | C | C | C | C | C | C |
| 12 | B | C | B | B | C | B |
| 13 | B | C | C | C | C | B |
| 14 | B | B | C | C | C | B |
| 15 | B | C | C | C | C | B |
| 16 | B | C | C | B | C | B |
| 17 | C | C | C | B | C | C |
| 18 | B | C | C | A | B | C |
| 19 | B | B | C | C | C | B |
| 20 | B | C | C | B | C | B |
| 21 | B | B | B | C | B | B |
| 22 | B | B | C | C | C | B |
| 23 | B | C | B | B | B | B |
| 24 | B | C | B | B | A | B |
| 25 | B | C | B | B | B | B |
| 26 | B | C | B | B | C | B |
| 27 | B | C | A | B | A | B |

TABLE 7

| Example No. | Evaluation 1 Decap | Evaluation 2 Discharge stability | Evaluation 3 Drying properties | Evaluation 4 Coverage | Evaluation 5 Water resistance | Evaluation 6 Stability |
|---|---|---|---|---|---|---|
| 28 | B | C | B | B | C | B |
| 29 | C | C | B | B | C | B |
| 30 | B | B | B | B | B | B |
| 31 | B | B | B | B | B | B |
| 32 | B | B | B | B | B | A |
| 33 | B | B | B | B | C | B |
| 34 | B | B | B | B | B | A |
| 35 | B | B | B | B | A | A |
| 36 | B | B | B | B | B | A |
| 37 | B | B | B | B | A | C |
| 38 | B | B | A | B | B | B |
| 39 | B | B | B | B | A | A |
| 40 | B | B | A | B | A | A |
| 41 | B | B | A | B | B | A |
| 42 | B | A | B | B | C | C |
| 43 | B | B | A | B | A | A |
| 44 | B | A | C | B | C | A |
| 45 | B | B | B | B | B | A |
| 46 | C | B | B | B | A | A |

TABLE 7-continued

| Example No. | Evaluation 1 Decap | Evaluation 2 Discharge stability | Evaluation 3 Drying properties | Evaluation 4 Coverage | Evaluation 5 Water resistance | Evaluation 6 Stability |
|---|---|---|---|---|---|---|
| 47 | C | C | A | C | A | A |
| 48 | C | C | A | B | A | A |
| 49 | C | C | A | B | A | C |
| 50 | A | A | A | B | A | A |
| 51 | A | A | A | A | A | A |
| 52 | A | A | A | A | A | A |
| 53 | B | A | A | C | C | A |
| 54 | B | A | A | B | C | A |

TABLE 8

| Comparative Example No. | Evaluation 1 Decap | Evaluation 2 Discharge stability | Evaluation 3 Drying properties | Evaluation 4 Coverage | Evaluation 5 Water resistance | Evaluation 6 Stability |
|---|---|---|---|---|---|---|
| 1 | D | D | C | D | C | D |
| 2 | D | C | D | C | C | C |
| 3 | D | D | D | C | D | D |
| 4 | D | D | D | C | D | D |
| 5 | D | D | D | C | D | D |
| 6 | D | C | C | D | C | C |
| 7 | D | D | C | D | C | D |
| 8 | D | D | D | C | C | D |
| 9 | C | C | D | D | D | C |
| 10 | D | C | C | D | C | C |
| 11 | C | C | D | C | D | D |
| 12 | D | C | D | C | D | D |
| 13 | D | C | D | C | C | D |
| 14 | D | C | D | C | C | D |
| 15 | D | C | D | C | C | D |

Examples 1 to 54 are examples of water-based inkjet inks containing water, a pigment, a water-soluble organic solvent and a binder resin, wherein the water-soluble organic solvent contains a water-soluble organic solvent having a surface tension of 30 to 50 mN/m and a boiling point at 1 atmosphere of 180 to 230° C. in an amount of 15 to 50% by weight relative to the total weight of the water-based inkjet ink, and the acid value of the binder resin is at least 5 mgKOH/g but less than 60 mgKOH/g. In these examples, the results for the decap properties at the inkjet head, the ink discharge stability during high-speed printing, the drying properties, the coverage of solid printed matter with a print ratio of 100%, the water resistance of the printed matter, and the storage stability were all of practically usable levels.

Examples 1 to 4 were systems in which the type of pigment used was varied, and the changes in the drying properties in the inkjet printer used as the evaluation device were evaluated. Among these examples, Example 4 exhibited a drying properties evaluation of "B", which was a more favorable result than the other colors. It is thought that this is because the carbon black contained in the ink of Example 4 favorably absorbed the rays from the IR lamp used in the drying step in the evaluation device, enabling a more favorable dried state to be achieved. In the remaining evaluations, in order to enable the effect of the combination between the water-soluble organic solvent and the binder resin to be evaluated without being influenced by the pigment, evaluations were all performed using the cyan ink.

Examples 1 and 5 to 15 are examples in which the type and amount of the binder resin and the amount of the solvent were all kept the same, and the type of solvent was varied. Based on a comparison of these examples, it is evident that by using a specified water-soluble organic solvent having a boiling point at 1 atmosphere of 210 to 230° C. and having at least two hydroxyl groups, as in Examples 5, 8, 14 and 15, favorable moisture retention of the ink on the inkjet nozzles could be ensured, and improved results could be achieved for the decap properties and the discharge stability.

On the other hand, by using specified water-soluble organic solvents having a surface tension of 30 to 32 mN/m, as in Examples 7, 9 and 12, thereby imparting the ink on the printing substrate with favorable penetration and wet spreading properties, the drying properties and coverage of the ink were improved, and an image quality improvement effect was able to be confirmed. Of these example, Example 12 which contained an alkanediol of at least 4 carbon atoms was able to achieve a combination of moisture retention on the inkjet head nozzles, a penetration effect into the printing substrate and favorable drying properties, and favorable results were obtained for the evaluations of the decap properties, the drying properties and the ink coverage.

Examples 16 and 17 are examples based on Example 12 in which the amount of solvent has been changed. Based on these examples, it was confirmed that by setting the amount of the specified water-soluble organic solvent to 15 to 25%, the ink storage stability and decap properties were more favorable. It is thought that the reason the decap properties improve is that even if the printer is placed in standby mode for a long period, causing water volatilization to proceed on the inkjet nozzles and the water-soluble organic solvent content to increase, aggregation of the pigment dispersion still does not occur. Based on these results, it can be stated that it is particularly preferable that the ink contains from 15 to 25% of the specified water-soluble organic solvent.

Examples 18 to 23 are systems used for verifying the effects of water-soluble organic solvents used in combination with the specific water-soluble organic solvent. In Examples 18 to 23, it was found that by setting the proportion of the alkanediol of at least 4 carbon atoms to 10 to 95% of the total weight of all water-soluble organic solvents contained in the ink, in addition to favorable decap properties, the storage stability could be improved, and depending on the type and amount of the other water-soluble organic solvent that was used in combination with the alkanediol, the discharge stability, the drying properties and the coverage could also be improved.

Examples 24 to 41 are systems for verifying the effects when the acid value, glass transition temperature (Tg) and resin structure of the binder resin are changed. Examples 24 and 27 represent systems that used a binder resin having a low acid value or a high glass transition temperature, and an improvement in the water resistance was confirmed. Further, Examples 30 to 41 are systems that used a binder resin having a block structure, and an improvement in the discharge stability was confirmed, with the results for each of the decap properties, the discharge stability, the drying properties and the coverage all being a level "B". Among these examples, Examples 35, 36, 40 and 41 represent systems that contained at least 12.5% by weight of stearyl methacrylate as a B block, and although the detailed reasons are unclear, the result for the ink storage stability was an extremely favorable "A" in each case.

Examples 42 to 48 are systems based on Example 41 in which the molecular weight and amount of the binder resin were changed. Of these examples, Examples 44 to 47 represent systems based on Example 43 in which the amount of the binder resin was changed, and it was confirmed that in Examples 43 and 45, in which the amount of the binder resin was within a range from 2.0 to 8.0% by weight, particularly favorable results were obtained, with all of the evaluation results being level "B" or better.

Examples 49 to 52 are systems based on Example 43 in which the pigment dispersion was changed from a self-dispersing system to a dispersion of a pigment dispersing resin. Among these examples, Examples 50 to 52 represent systems in which the acid value of the pigment dispersing resin is at least 100 mgKOH/g, and almost all the evaluation results were at the "A" level. It is thought that this is because the dispersed state of the pigment can be favorably maintained even during the process of water volatilization on the inkjet nozzles, meaning further improvements in the decap properties and the discharge stability can be realized.

Examples 53 and 54 are systems based on Example 44 in which an alkanediol of not more than 3 carbon atoms was used. In Example 44, the drying properties evaluation was "C", whereas the same evaluation in Examples 53 and 54 was "A", confirming an improvement in the drying properties by using an alkanediol of not more than 3 carbon atoms. Further, when a surfactant was also used, as in Example 54, the wet spreading on the printing substrate was able to be controlled, and the coverage evaluation was able to be improved to the "B" level. Furthermore, by using a dispersion of a pigment dispersing resin as the pigment dispersion, the storage stability of the pigment dispersion was improved, and results obtained for the decap properties and discharge stability were superior to those obtained for Example 5 which also used 1,3-propanediol.

In contrast with the above results, as illustrated in Table 8, Comparative Examples 1, 7 to 9, and 13 to 15, which represent examples in which no specified water-soluble organic solvent was used, exhibited inferior results for all of the evaluations compared with the Examples, and yielded a result that did not reach a practically usable level in at least one of the evaluations. In particular, it was confirmed that when only a solvent having a low surface tension was used, the decap properties, the discharge stability and the storage stability deteriorated significantly.

Further, Comparative Examples 1 to 6 represent examples in which a binder resin having an acid value of at least 5 mgKOH/g but less than 60 mgKOH/g was not used, and all of the evaluation results were inferior compared with the Examples, with at least one evaluation result not reaching a practically usable level. In particular, in Comparative Examples 3 to 5, the acid value of the water-soluble resin used as the binder resin increased, and it was confirmed that the decap properties, the discharge stability and the storage stability deteriorated.

Comparative Examples 10 to 12 represents examples in which the amount of the specified water-soluble organic solvent was not within the range from 15 to 50% by weight relative to the total weight of the water-based inkjet ink, and the result of at least one evaluation did not reach a practically usable level.

The invention claimed is:

1. A water-based inkjet ink comprising at least water, a pigment, a water-soluble organic solvent and a binder resin, wherein
   the water-soluble organic solvent comprises a water-soluble organic solvent having a surface tension of 30 to 50 mN/m and a boiling point at 1 atmosphere of 180 to 230° C.,
   water-soluble organic solvent having a surface tension of 30 to 50 mN/m and a boiling point at 1 atmosphere of 180 to 230° C. comprises a solvent having an HLB value of not more than 8,
   an amount of the water-soluble organic solvent having a surface tension of 30 to 50 mN/m and a boiling point at 1 atmosphere of 180 to 230° C. is from 15 to 50% by weight relative to a total weight of the water-based inkjet ink, and
   an acid value of the binder resin is at least 5 mgKOH/g but 40 mgKOH/g or less.

2. The water-based inkjet ink according to claim 1, wherein the water-soluble organic solvent comprises an alkanediol of at least 4 carbon atoms.

3. The water-based inkjet ink according to claim 2, wherein an amount of the alkanediol of at least 4 carbon atoms is from 10 to 95% by weight relative to a total weight of the water-soluble organic solvent.

4. The water-based inkjet ink according to claim 1, wherein the water-soluble organic solvent comprises an alkanediol of not more than 3 carbon atoms.

5. The water-based inkjet ink according to claim 1, wherein the binder resin is a copolymer having at least a structural unit derived from a hydrophilic monomer having a carboxyl group and a structural unit derived from a monomer having an alkyl group.

6. The water-based inkjet ink according to claim 1, wherein the binder resin comprises at least a (meth)acrylic resin and/or a styrene-(meth)acrylic-based copolymer.

7. The water-based inkjet ink according to claim 1, wherein a weight average molecular weight (Mw) of the binder resin is within a range from 5,000 to 20,000.

8. The water-based inkjet ink according to claim 1, wherein an amount of the binder resin is from 2 to 10% by weight relative to a total weight of the water-based inkjet ink.

9. The water-based inkjet ink according to claim 1, wherein the water-based inkjet ink has a surface tension at 25° C. of 20 to 35 mN/m and a viscosity at 25° C. of 1 to 20 mPa·s.

10. A method for producing the water-based inkjet ink according to claim 1, wherein the method includes a step of mixing and stirring at least a pigment dispersion comprising the pigment and water, the binder resin, and the water-soluble organic solvent.

11. A production method for water-based inkjet ink printed matter that includes a step of applying the water-based inkjet ink according to claim 1 to a substrate being transported at a speed of at least 30 m/minute using a line pass type inkjet printing system, and a step of applying thermal energy to the substrate to dry the water-based inkjet ink.

12. The production method for water-based inkjet ink printed matter according to claim 11, wherein a method used for drying the water-based inkjet ink uses infrared irradiation.

13. Printed matter obtained by printing the water-based inkjet ink according to claim 1 onto a substrate.

14. A water-based inkjet ink comprising at least water, a pigment, a water-soluble organic solvent and a binder resin, wherein
   the water-soluble organic solvent comprises a water-soluble organic solvent having a surface tension of 30 to 50 mN/m and a boiling point at 1 atmosphere of 180 to 230° C.,
   the water-soluble organic solvent having a surface tension of 30 to 50 mN/m and a boiling point at 1 atmosphere of 180 to 230° C. comprises a solvent having an HLB value of not more than 8,
   an amount of the water-soluble organic solvent having a surface tension of 30 to 50 mN/m and a boiling point at 1 atmosphere of 180 to 230° C. is from 15 to 50% by weight relative to a total weight of the water-based inkjet ink,
   an acid value of the binder resin is at least 5 mgKOH/g but less than 60 mgKOH/g, and
   the binder resin has a block structure.

15. A water-based inkjet ink comprising at least water, a pigment, a water-soluble organic solvent and a binder resin, wherein
   the water-soluble organic solvent comprises a water-soluble organic solvent having a surface tension of 30 to 50 mN/m and a boiling point at 1 atmosphere of 210 to 230° C.,
   the water-soluble organic solvent having a surface tension of 30 to 50 mN/m and a boiling point at 1 atmosphere of 210 to 230° C. includes a solvent having two or more hydroxyl groups,
   an amount of the water-soluble organic solvent having a surface tension of 30 to 50 mN/m and a boiling point at 1 atmosphere of 180 to 230° C. is from 15 to 50% by weight relative to a total weight of the water-based inkjet ink, and
   an acid value of the binder resin is at least 5 mgKOH/g but 40 mgKOH/g or less.

16. The water-based inkjet ink according to claim 15, wherein the binder resin is a copolymer having at least a structural unit derived from a hydrophilic monomer having a carboxyl group and a structural unit derived from a monomer having an alkyl group.

17. The water-based inkjet ink according to claim 5, wherein the alkyl group of the monomer has 12 to 36 carbon atoms.

18. The water-based inkjet ink according to claim 16, wherein the alkyl group of the monomer has 12 to 36 carbon atoms.

* * * * *